United States Patent
Ueno et al.

(10) Patent No.: US 12,530,914 B2
(45) Date of Patent: Jan. 20, 2026

(54) WORK RECORD EXTRACTION DEVICE AND WORK RECORD EXTRACTION SYSTEM

(71) Applicant: Hitachi, Ltd., Tokyo (JP)

(72) Inventors: Takaaki Ueno, Tokyo (JP); Shoji Yamamoto, Tokyo (JP); Shingo Hayashi, Tokyo (JP); Masahiko Niioka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 18/109,789

(22) Filed: Feb. 14, 2023

(65) Prior Publication Data

US 2023/0282014 A1    Sep. 7, 2023

(30) Foreign Application Priority Data

Mar. 2, 2022   (JP) .................................. 2022-032018

(51) Int. Cl.
   *G06V 30/32*   (2022.01)
   *G06V 30/142*  (2022.01)
   *G06V 30/18*   (2022.01)

(52) U.S. Cl.
   CPC .... *G06V 30/18152* (2022.01); *G06V 30/1423* (2022.01); *G06V 30/387* (2022.01)

(58) Field of Classification Search
   CPC ................................................ G06V 30/00–43
   See application file for complete search history.

(56) References Cited

U.S. PATENT DOCUMENTS

| | | | | |
|---|---|---|---|---|
| 5,805,725 A | * | 9/1998 | Sakata | G06V 30/1423 382/187 |
| 10,383,553 B1 | * | 8/2019 | Glenn | A61B 5/16 |
| 2009/0169113 A1 | * | 7/2009 | Geiger | G06T 7/12 382/203 |
| 2016/0055329 A1 | * | 2/2016 | Akula | G06F 3/04883 726/7 |

(Continued)

FOREIGN PATENT DOCUMENTS

| | | |
|---|---|---|
| JP | H07-219701 19 | 8/1995 |
| JP | 2001-074481 A | 3/2001 |
| JP | 2019-028776 A | 2/2019 |

OTHER PUBLICATIONS

Japanese Patent Office, Office Action, Application No. 2022-032018, dated Dec. 3, 2024, in 3 pages.

*Primary Examiner* — Sean T Motsinger
(74) *Attorney, Agent, or Firm* — PROCOPIO, CORY, HARGREAVES & SAVITCH LLP

(57) ABSTRACT

Provided is a work record extraction device that can correctly select a drawing element corresponding to handwriting even if there is a handwriting deviation when position coordinates are collated between handwritten data overwritten on drawing data by manual input and a drawing element on the drawing data. The work record extraction device according to the invention sets, around a drawing element, a boundary area including at least a part of the drawing element, determines whether handwritten data passes through at least a part of the boundary area, and determines that the handwritten data passes through the drawing element in a case where the handwritten data passes through at least a part of the boundary area.

14 Claims, 24 Drawing Sheets

(56) References Cited

U.S. PATENT DOCUMENTS

| | | | |
|---|---|---|---|
| 2016/0098594 A1* | 4/2016 | Sugiura | G06V 30/36 |
| | | | 382/189 |
| 2016/0246498 A1* | 8/2016 | Rav-Noy | G06F 3/04883 |
| 2017/0109578 A1* | 4/2017 | Bednarowicz | G06F 16/353 |
| 2017/0154230 A1* | 6/2017 | Dow | G06V 30/36 |
| 2018/0040257 A1* | 2/2018 | Hsiao | G06F 3/04883 |
| 2020/0143575 A1* | 5/2020 | Kang | G06T 11/60 |
| 2022/0058879 A1* | 2/2022 | Rohan | G06T 19/006 |
| 2022/0108500 A1* | 4/2022 | Welsh | G06T 11/203 |

* cited by examiner

| INK No. | HANDWRITING GENERATION TIME POINT | USER ID | TERMINAL ID | PEN ATTRIBUTE | | | | POINT GROUP COORDINATE | WD RESOLUTION (W, H) |
|---|---|---|---|---|---|---|---|---|---|
| | | | | COLOR | WIDTH | TRANSMITTANCE | PEN TYPE | | |
| 1 | yyyy/mm/dd 15:34:00 | 1 | A | RED | 6 pt | 60% | MARKER | [STROKE 1] | (XX, YY) |
| 2 | yyyy/mm/dd 15:34:32 | 1 | A | RED | 6 pt | 60% | MARKER | [STROKE 1] | (XX, YY) |
| 3 | yyyy/mm/dd 15:34:19 | 1 | A | BLACK | 2 pt | 0% | PEN | [STROKE 1, STROKE 2, STROKE 3] | (XX, YY) |
| ⋮ | ⋮ | ⋮ | ⋮ | ⋮ | ⋮ | ⋮ | ⋮ | ⋮ | ⋮ |

| WIRE No. | NAME | COORDINATE (START POINT, END POINT) | CONFIGURATION OF LINE INFORMATION [LINE 1, ... , LINE N] |
|---|---|---|---|
| 1 | WIRE AB | [(0,500), (50,500)] | [(0,500), (50,500)] |
| 2 | WIRE CD | [(40,300), (40,400)] | [(40,300), (40,400)] |
| 3 | WIRE E3 | [(10,150), (45,175)] | [(10,150), (45,175)] |
| 4 | WIRE F12 | [(25,75), (50,0)] | [(5,75), (25,75)], [(5,0), (5,75)], [(5,0), (50,0)] |
| ⋮ | ⋮ | ⋮ | ⋮ |

111-1

111-A

| DRAWING SYMBOL No. | NAME | COORDINATE (START POINT, END POINT) | CONNECTION DIRECTION WITH WIRE |
|---|---|---|---|
| 1 | BREAKER | [(50,240), (135,300)] | x DIRECTION |
| 2 | CHANGEOVER SWITCH | [(148,234), (366,333)] | y DIRECTION |
| 3 | IC | [(123, 27), (328, 125)] | x-y DIRECTION |
| ⋮ | ⋮ | ⋮ | ⋮ |

111-2

111-B

| CHARACTER No. | NAME | COORDINATE (START POINT, END POINT) | CHARACTER STRING DIRECTION |
|---|---|---|---|
| 1 | AB01Δ | [(7,254), (167,289)] | x DIRECTION |
| 2 | Sheet No. AB001 | [(185,243), (312,301)] | x DIRECTION |
| 3 | CONNECTION DIAGRAM | [(235,2), (272,200)] | y DIRECTION |
| ⋮ | ⋮ | ⋮ | ⋮ |

111-3

111-C

FIG. 7A
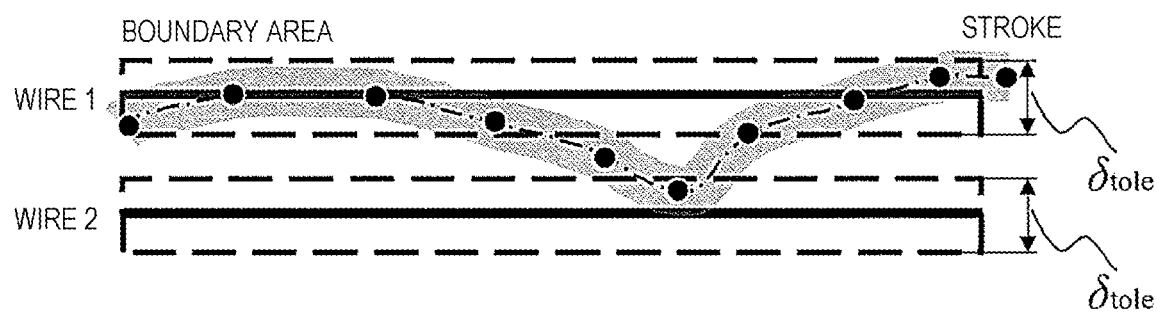
FIG. 7B
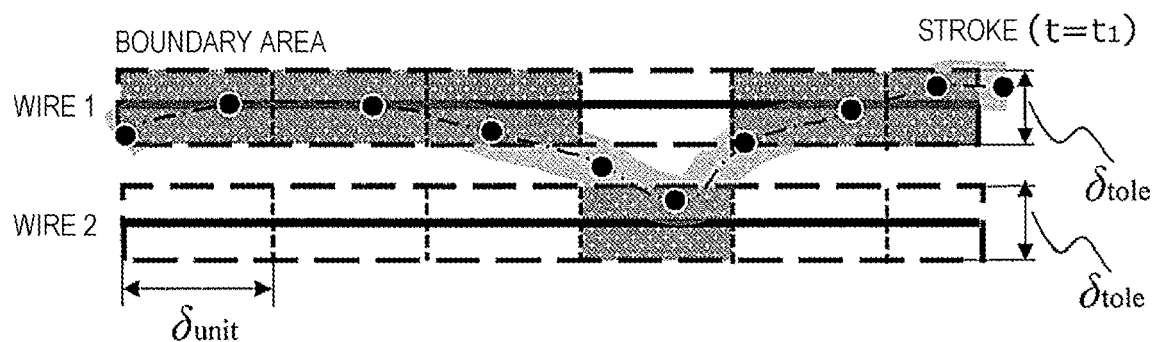
 DIVIDED BOUNDARY AREA INCLUDING POINT IN STROKE
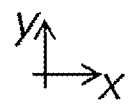

FIG. 10A
CONNECTION DIRECTION WITH WIRE IS "x DIRECTION"
⇒ [ ALLOWABLE WIDTH: y DIRECTION
    UNIT WIDTH: x DIRECTION ]
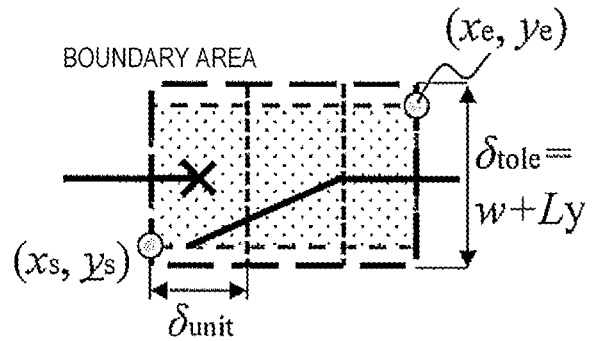
FIG. 10B
CONNECTION DIRECTION WITH WIRE IS "y DIRECTION"
⇒ [ ALLOWABLE WIDTH: x DIRECTION
    UNIT WIDTH: y DIRECTION ]
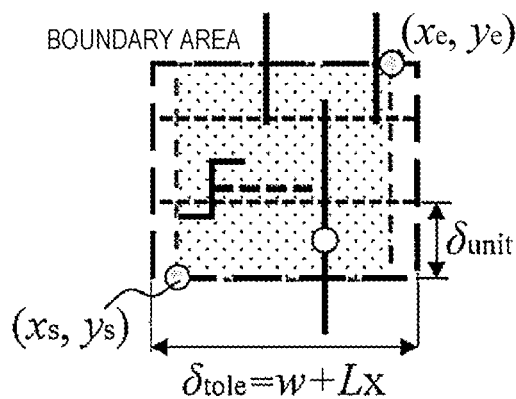

FIG. 11

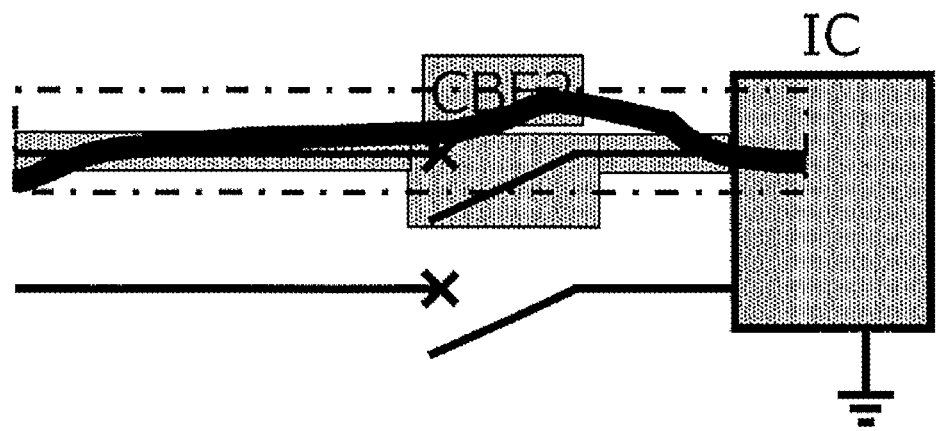

⌐ ─ ┐
└ ─ ┘ CIRCUMSCRIBED RECTANGLE OF STROKE

▓▓▓ DRAWING ELEMENT USED FOR COLLATION

FIG. 12

| DRAWING ELEMENT | NAME | COORDINATES (START POINT, END POINT) | N | Nunit | RATIO N/Nunit | DETERMINATION RESULT $Th\_check=0.5$ (CHECK/PASS) | CHECK TIME POINT | INK No. | STROKE No. | POINT No. |
|---|---|---|---|---|---|---|---|---|---|---|
| WIRE | WIRE AB | [(77, 22), (180, 22)] | 4 | 6 | 0.67 | CHECK | t1 | 1 | 1 | 2 |
| WIRE | WIRE KL | [(200,22), (300,22)] | 4 | 5 | 0.8 | CHECK | t1 | 1 | 2 | 1 |
| WIRE | WIRE ZZ | [(201, 149), (301, 149)] | 1 | 5 | 0.2 | PASS | t5 | 5 | 1 | 3 |
| WIRE | WIRE ZZ | [(201, 149), (301, 149)] | 1 | 5 | 0.2 | PASS | t8 | 8 | 1 | 3 |
| DRAWING SYMBOL | BREAKER | [(180, 32), (200, 12)] | 2 | 2 | 1.0 | CHECK | t1 | 1 | 1 | 12 |
| DRAWING SYMBOL | GROUND | [(30, 20), (50, 40)] | 0 | 2 | 0.0 | PASS | — | — | — | — |
| CHARACTER | POWER SUPPLY | [(180, 32), (200, 12)] | 2 | 2 | 0.8 | CHECK | t2 | 2 | 2 | 1 |
| ⋮ | ⋮ | ⋮ | ⋮ | ⋮ | ⋮ | ⋮ | ⋮ | ⋮ | ⋮ | ⋮ |

131

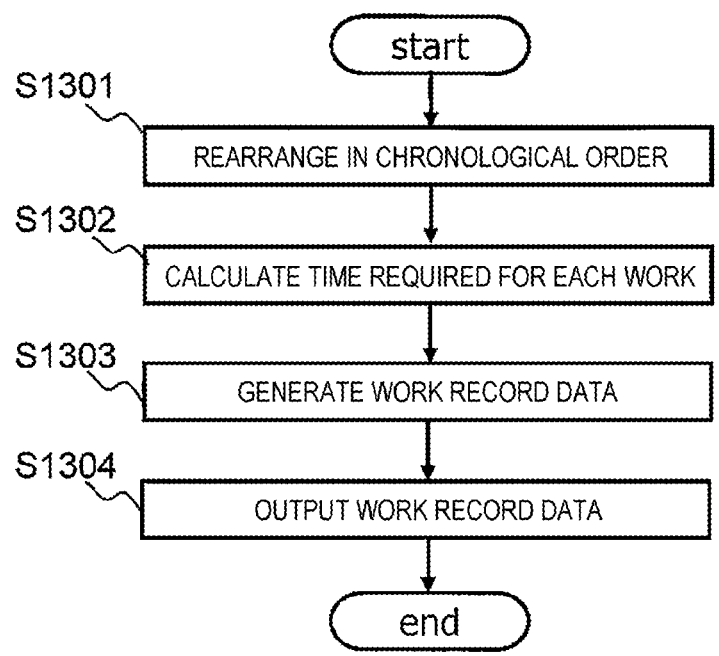

FIG. 14A

| ORDER | WORK DATE AND TIME | TYPE | NAME | WORK TIME | COORDINATE | WORK DRAWING NAME | DETERMI-NATION RESULT | WORKER ID |
|---|---|---|---|---|---|---|---|---|
| #1 | yyyy/mm/dd 15:34:00 | WIRE | WIRE AB | — | $[(x_{s1}, y_{s1}), (x_{e1}, y_{e1})]$ | aaa.pdf | CHECK | 1 |
| #2 | yyyy/mm/dd 15:34:02 | DRAWING SYMBOL | TWIST WIRE | 2 | $[(x_{s2}, y_{s2}), (x_{e2}, y_{e2})]$ | aaa.pdf | CHECK | 1 |
| #3 | yyyy/mm/dd 15:34:19 | WIRE | WIRE CD | 17 | $[(x_{s3}, y_{s3}), (x_{e3}, y_{e3})]$ | aaa.pdf | CHECK | 1 |
| #4 | yyyy/mm/dd 15:34:19 | DRAWING SYMBOL | CONNECTION POINT | (17) | $[(x_{s4}, y_{s4}), (x_{e4}, y_{e4})]$ | aaa.pdf | CHECK | 1 |
| #5 | yyyy/mm/dd 15:34:19 | WIRE | WIRE EFG | (17) | $[(x_{s5}, y_{s5}), (x_{e5}, y_{e5})]$ | aaa.pdf | CHECK | 1 |
| #6 | yyyy/mm/dd 15:35:06 | CHARACTER | CBE1Δ | 47 | $[(x_{s6}, y_{s6}), (x_{e6}, y_{e6})]$ | aaa.pdf | CHECK | 1 |
| #7 | yyyy/mm/dd 15:35:29 | WIRE | WIRE 7A | 23 | $[(x_{s7}, y_{s7}), (x_{e7}, y_{e7})]$ | aaa.pdf | CHECK | 1 |
| ⋮ | ⋮ | ⋮ | ⋮ | ⋮ | ⋮ | ⋮ | ⋮ | ⋮ |
| #N | yyyy/mm/dd 16:01:12 | CHARACTER | TO Sheet No. AB001 | 22 | $[(x_{sn}, y_{sn}), (x_{en}, y_{en})]$ | aaa.pdf | CHECK | 1 |
| #— | — | WIRE | WIRE 8B | — | $[(x_{sn+1}, y_{sn+1}), (x_{en+1}, y_{en+1})]$ | aaa.pdf | PASS | 1 |
| #— | — | DRAWING SYMBOL | BREAKER | — | $[(x_{sn+1}, y_{sn+1}), (x_{en+1}, y_{en+1})]$ | aaa.pdf | PASS | 1 |
| ⋮ | ⋮ | ⋮ | ⋮ | ⋮ | ⋮ | ⋮ | ⋮ | ⋮ |
| #— | — | CHARACTER | SLOT | — | $[(x_{sn+1}, y_{sn+1}), (x_{en+1}, y_{en+1})]$ | aaa.pdf | PASS | 1 |

| WORKER ID | NAME | NUMBER OF YEARS OF EXPERIENCE | DEVICE ID | SITE |
|---|---|---|---|---|
| 1 | HITACHI TAROU | 10 YEARS | A | SITE 1 |
| 2 | HITACHI JIROU | 12 YEARS | B | SITE 1 |
| 3 | HITACHI HANAKO | 3 YEARS | C | SITE 1 |
| 4 | HITACHI SABUROU | 1 YEAR | D | SITE 2 |

FIG. 18A
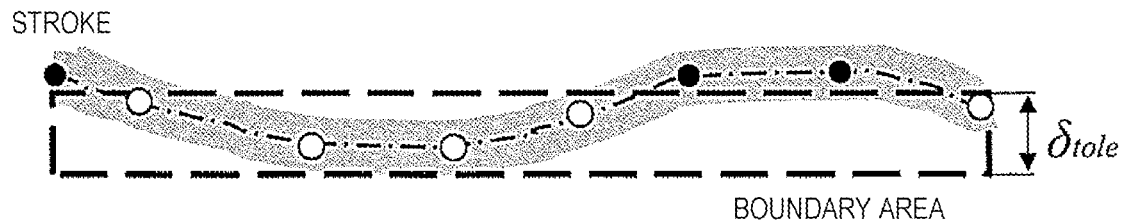
○ : POINT IN BOUNDARY AREA
● : POINT OUTSIDE BOUNDARY AREA
FIG. 18B
  BOUNDARY AREA
○ : POINT IN BOUNDARY AREA
● : POINT OUTSIDE BOUNDARY AREA (NUMBER : $n_{out}$)
WHEN $Th\_note = 0.5$
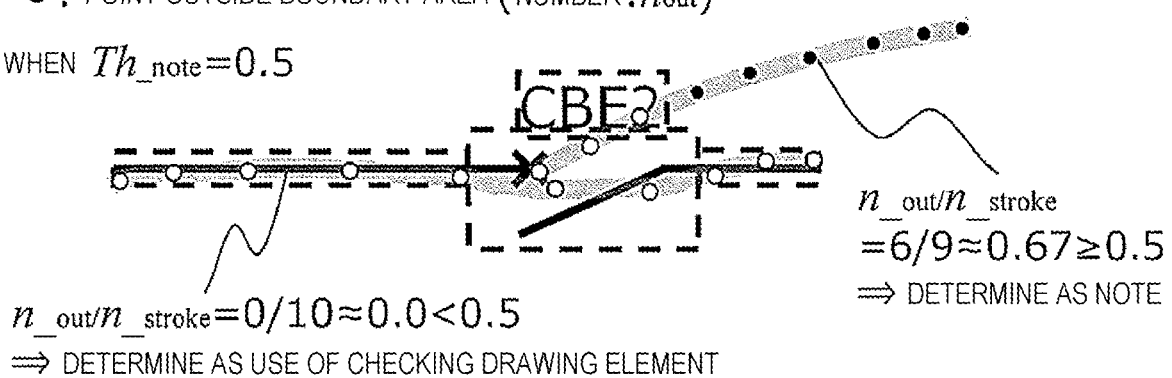

FIG. 19

| INK No. | HANDWRITING GENERATION TIME POINT | USER ID | TERMINAL ID | PEN ATTRIBUTE | | | | POINT GROUP COORDINATE | WD RESOLUTION | $n$_out | $n$_stroke | RATIO $n$_out/ $n$_stroke | DETERMINATION $Th$_note ≈0.5 |
|---|---|---|---|---|---|---|---|---|---|---|---|---|---|
| | | | | COLOR | WIDTH | TRANSMI-TTANCE | PEN TYPE | | | | | | |
| 1 | t1 | 1 | A | RED | 6 pt | 60% | MARKER | [STROKE 1] | (XX, YY) | 2 | 12 | 0.17 | CHECK |
| 2 | t2 | 1 | A | RED | 6 pt | 60% | MARKER | [STROKE 1] | (XX, YY) | 6 | 9 | 0.67 | NOTE |
| 3 | t3 | 1 | A | RED | 6 pt | 60% | MARKER | [STROKE 1, STROKE 2, STROKE 3, STROKE 4] | (XX, YY) | [4, 6, 6, 5] (21) | [4, 6, 6, 5] (21) | [1.0,1.0, 1.0,1.0] (1.0) | NOTE |
| ⋮ | ⋮ | ⋮ | ⋮ | ⋮ | ⋮ | ⋮ | ⋮ | ⋮ | ⋮ | ⋮ | ⋮ | ⋮ | ⋮ |

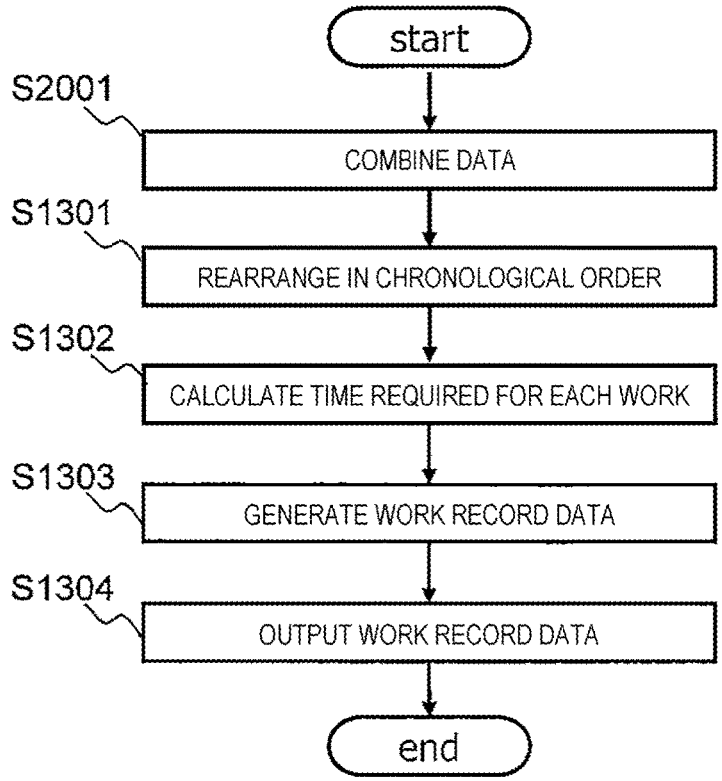

FIG. 21

| ORDER | WORK DATE AND TIME | TYPE | NAME | WORK TIME | COORDINATE | WORK DRAWING NAME | PRESENCE OR ABSENCE OF CHECK | WORKER ID |
|---|---|---|---|---|---|---|---|---|
| #1 | yyyy/mm/dd 15:34:00 | WIRE | WIRE AB | — | $[(x_{s1}, y_{s1}), (x_{e1}, y_{e1})]$ | aaa.pdf | YES | 1 |
| #2 | yyyy/mm/dd 15:34:02 | DRAWING SYMBOL | TWIST WIRE | 2 | $[(x_{s2}, y_{s2}), (x_{e2}, y_{e2})]$ | aaa.pdf | YES | 1 |
| #3 | yyyy/mm/dd 15:34:19 | WIRE | WIRE CD | 17 | $[(x_{s3}, y_{s3}), (x_{e3}, y_{e3})]$ | aaa.pdf | YES | 1 |
| #4 | yyyy/mm/dd 15:34:19 | DRAWING SYMBOL | CONNECTION POINT | (17) | $[(x_{s4}, y_{s4}), (x_{e4}, y_{e4})]$ | aaa.pdf | YES | 1 |
| #5 | yyyy/mm/dd 15:34:19 | WIRE | WIRE EFG | (17) | $[(x_{s5}, y_{s5}), (x_{e5}, y_{e5})]$ | aaa.pdf | YES | 1 |
| #6 | yyyy/mm/dd 15:35:01 | NOTE | NOTE 1 | 42 | [STROKE 1, STROKE 2, STROKE 3, STROKE 4] | aaa.pdf | — | 1 |
| #7 | yyyy/mm/dd 15:35:06 | CHARACTER | CBE1Δ | 5 | $[(x_{s6}, y_{s6}), (x_{e6}, y_{e6})]$ | aaa.pdf | YES | 1 |
| #8 | yyyy/mm/dd 15:35:29 | WIRE | WIRE 7A | 23 | $[(x_{s7}, y_{s7}), (x_{e7}, y_{e7})]$ | aaa.pdf | YES | 1 |
| #9 | yyyy/mm/dd 15:36:45 | NOTE | NOTE 2 | 76 | [STROKE 1, STROKE 2] | aaa.pdf | — | 1 |
| ⋮ | ⋮ | ⋮ | ⋮ | ⋮ | ⋮ | ⋮ | ⋮ | ⋮ |
| #N | yyyy/mm/dd 16:01:12 | CHARACTER | TO Sheet No. AB001 | 22 | $[(x_{sn}, y_{sn}), (x_{en}, y_{en})]$ | aaa.pdf | YES | 1 |
| #— | — | WIRE | WIRE 8B | — | $[(x_{sn+1}, y_{sn+1}), (x_{en+1}, y_{en+1})]$ | aaa.pdf | NO | 1 |
| #— | — | DRAWING SYMBOL | BREAKER | — | $[(x_{sn+1}, y_{sn+1}), (x_{en+1}, y_{en+1})]$ | aaa.pdf | NO | 1 |
| ⋮ | ⋮ | ⋮ | ⋮ | ⋮ | ⋮ | ⋮ | ⋮ | ⋮ |
| #— | — | CHARACTER | SLOT | — | $[(x_{sn+1}, y_{sn+1}), (x_{en+1}, y_{en+1})]$ | aaa.pdf | NO | 1 |

112

WORK RECORD EXTRACTION DEVICE AND WORK RECORD EXTRACTION SYSTEM

CROSS REFERENCE TO RELATED APPLICATIONS

The present application claims priority from Japanese patent application JP 2022-032018, filed on Mar. 2, 2022, the entire content of which is hereby incorporated by reference into this application.

BACKGROUND OF THE INVENTION

I. Field of the Invention

The present invention relates to a technique for extracting a work record created by a worker through an input by handwriting on a work terminal.

II. Description of Related Art

Along with the decrease in population and a declining birthrate and aging of society, the number of skilled engineers having high on-site skills is insufficient in manufacturing sites. In order to maintain a work quality, it is a challenge to transfer an advanced technique possessed by skilled engineers to young engineers. In order to promote skill transfer, it is necessary to develop a system that can operate a task regardless of skill by standardization of work procedures and know-how of the skilled engineers. In particular, in the work using drawings, the dependence of the on-site skills is high, and standardization of skilled know-how is an urgent need.

Examples of the work using drawings include a work of checking a conduction state or a sequence operation of a circuit by using an electrical drawing in which an arrangement or a connection of circuit components is shown, then overcoating a corresponding drawing element by handwriting. In order to standardize work procedures and know-how of the skilled engineers, it is necessary to extract and analyze work records on the drawings as digital information. In a case where an attempt is made to digitize a work record using a wearable device such as an electronic paper or a tablet, it is necessary to collate position coordinates of handwritten data overlaid on the drawing and a drawing element on a back surface thereof. The term "drawing element" mentioned here refers to, for example, wires, drawing symbols, and characters.

JP2001-074481A discloses a technique for searching for a route, which is specified by handwriting by a user, by collating position coordinates of handwritten data overlaid on map data and a road on the map.

SUMMARY OF THE INVENTION

In the method described in JP2001-074481A, one road closest to a sampling position of the handwritten data is always selected. In a case where the method is applied to the work using drawing described above, a handwritten path is far away from a drawing element, but when the drawing element is closest to handwriting, the drawing element is selected against the intention of a worker. In addition, in a case where a handwritten part is locally and largely deviated and comes close to another drawing element during the work, the other drawing element not intended by the worker is selected. Therefore, there is a demand for a system that can correctly extract a work record as intended by a worker even in a case where there is a handwriting deviation.

The invention has been made in view of the above problems, and an object thereof is to provide a work record extraction device that can correctly select a drawing element corresponding to handwriting even if there is a handwriting deviation when position coordinates are collated between handwritten data overwritten on drawing data by manual input and a drawing element on the drawing data.

A work record extraction device according to the invention sets, around a drawing element, a boundary area including at least a part of the drawing element, determines whether handwritten data passes through at least a part of the boundary area, and determines that the handwritten data passes through the drawing element in a case where the handwritten data passes through at least a part of the boundary area.

According to the work record extraction device of the invention, a drawing element corresponding to handwriting can be correctly selected even if there is a handwriting deviation when position coordinates are collated between handwritten data overwritten on drawing data and a drawing element on the drawing data. Problems, configurations, and effects other than those described above will be further clarified with the following description of embodiments.

BRIEF DESCRIPTION OF THE DRAWINGS

FIG. 7A is a diagram showing a unit width set to divide a boundary area;

FIG. 7B is a diagram showing a unit width set to divide the boundary area;

FIG. 10A shows an example in which an allowable width and a unit width are set for a drawing symbol;

FIG. 10B shows an example in which an allowable width and a unit width are set for a drawing symbol;

FIG. 11 is a diagram showing a method of narrowing down drawing elements to be collated;

FIG. 12 is a data table showing a configuration and a data example of check determination data 131;

FIG. 13 is a flowchart illustrating operations of a work record generation unit 141;

FIG. 14A shows an example of work record data 112;

FIG. 14B shows an example of the work record data 112;

FIG. 18A is a diagram illustrating a determination method for extracting a note in S1501;

FIG. 18B is a diagram illustrating the determination method for extracting a note in S1501;

FIG. 19 shows an example of note determination data 132;

FIG. 20 is a flowchart illustrating operations of the work record generation unit 141 according to the second embodiment;

FIG. 21 shows an example of the work record data 112 according to the second embodiment.

DESCRIPTION OF INVENTION

First Embodiment

Figure 1:
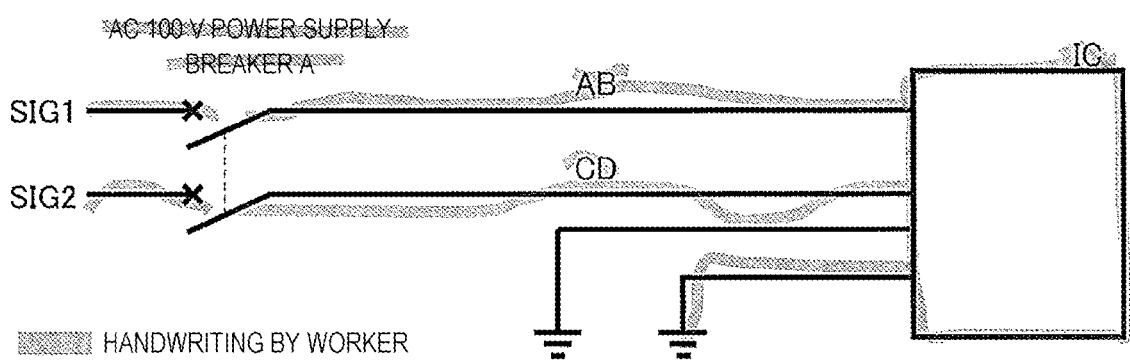
FIG. 1 shows an example of drawing data and handwritten data overwritten on the drawing data by a manual input.

FIG. 1 shows an example of drawing data and handwritten data overwritten on the drawing data by manual input. In this example, the drawing data shows an arrangement and connection of circuit components. Circuit components and wires are shown as drawing elements. A worker displays the drawing data on a work terminal, and inputs a work record using an input device or the like provided in the work terminal. For example, circuit components that are confirmed to be electrically conductive are traced by handwriting to input a conduction path. In FIG. 1, two conduction paths respectively starting from SIG1 and SIG2 are input by handwriting. In addition, the worker may trace a character string (such as a breaker A in FIG. 1) shown in the drawing data by handwriting.

As shown in FIG. 1, the input by handwriting may locally deviate. For example, on the right side of a character string "CD", the handwritten conduction path starting from SIG2 deviates in a manner of being close to a wire immediately below. In this case, it is difficult to specify which wire is traced on the data. Even in such a case, the invention aims to correctly identify a handwritten path (that is, which drawing element is traced).

Figure 2:
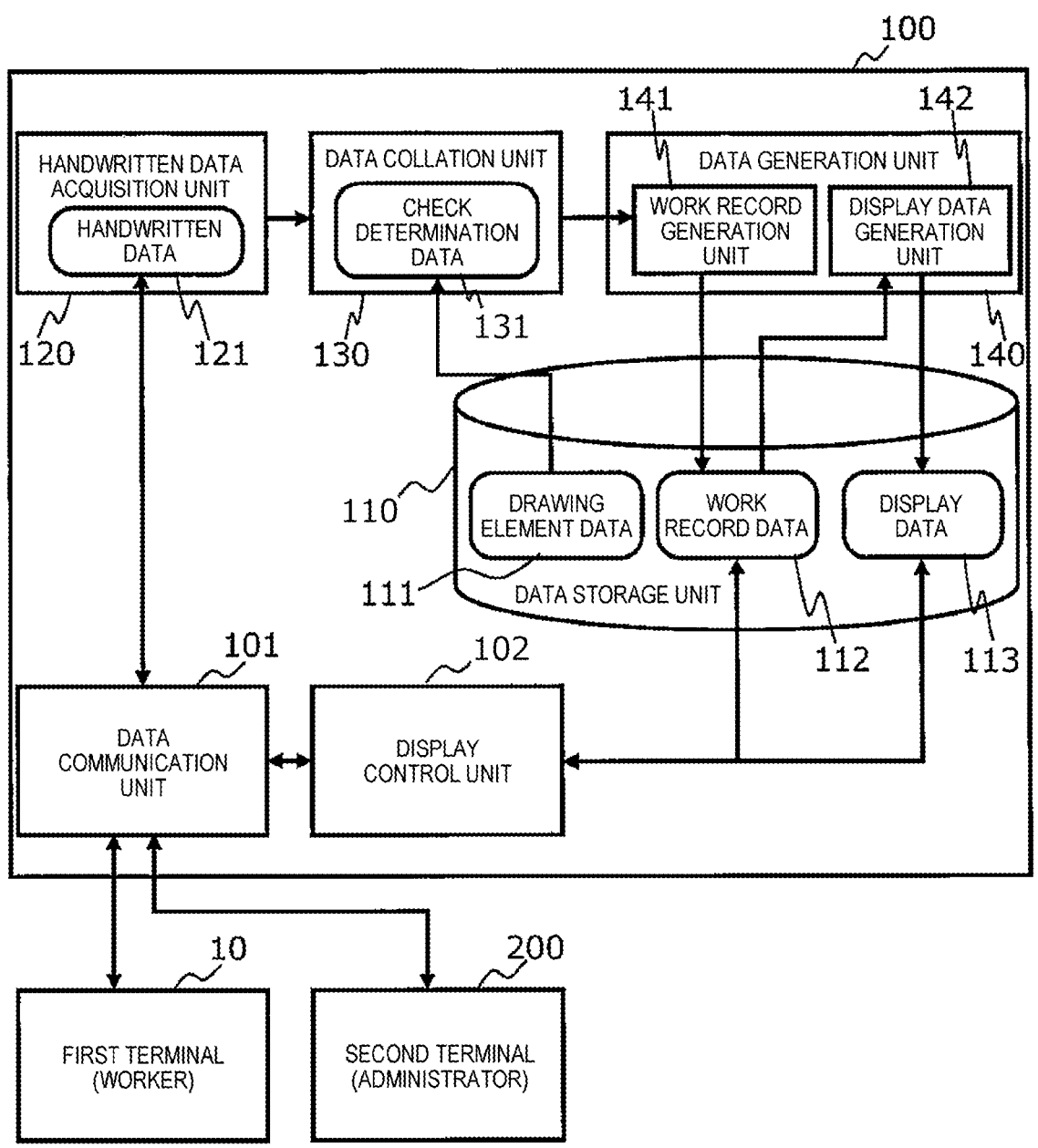
FIG. 2 is a functional block diagram of a work record extraction device 100 according to a first embodiment.

FIG. 2 is a functional block diagram of a work record extraction device 100 according to a first embodiment of the invention. The work record extraction device 100 is connected to a first terminal 10 used by a worker and a second terminal 200 used by an administrator. Examples of the first terminal 10 include a wearable device (hereinafter referred to as WD). The WD is a device such as a tablet and electronic paper that can record handwritten time-series data when handwriting is performed on a screen using an electronic pen or the like.

The work record extraction device 100 includes the following: a data communication unit 101 that transmits and receives data to and from the first terminal 10 and the second terminal 200; a display control unit 102 that controls the data communication unit 101 so as to output data to at least one of the first terminal 10 and the second terminal 200; a data storage unit 110; a handwritten data acquisition unit 120 that acquires data (handwritten data 121) showing a path handwritten on the first terminal 10 by a worker; a data collation unit 130 that collates position coordinates between the handwritten data 121 and drawing element data 111 corresponding to drawing for work to determine whether the worker selects or checks the drawing element data by handwriting; and a data generation unit 140 that generates work record data 112 based on a determination result from the data collation unit 130 and generates display data 113 by which the work record data 112 is visualized on the drawing.

The handwritten data acquisition unit 120 communicates with, for example, the first terminal 10 to acquire the handwritten data 121 showing a result input by handwriting on the first terminal 10 by the worker. The handwritten data 121 is a set of data including a generation time point, an attribute, a coordinate, and the like of ink data generated by handwriting. The ink data is a set of strokes generated when a user handwrites on the screen of the first terminal 10 with the electronic pen and moves the electronic pen away from the surface of the screen. In a case where the user handwrites on the screen again within a predetermined time after moving the electronic pen away from the surface of the screen, one piece of ink data has a plurality of strokes. The details of the stroke will be described later, and the stroke refers to a one-stroke path while the screen is being touched.

The data collation unit 130 includes the check determination data 131. The check determination data 131 shows a collation result of position coordinates between the handwritten data 121 and the drawing element data 111, and is a set of data including time point information and a determination result given by collation.

The data generation unit 140 includes the following: a work record generation unit 141 that generates the work record data 112 based on the determination result from the data collation unit 130; and a display data generation unit 142 that generates the display data 113 based on the work record data 112.

The data storage unit 110 stores the drawing element data 111, the work record data 112, and the display data 113. The drawing element data 111 is a set of data including coordinates and attributes of elements included in a drawing to be displayed on the first terminal 10. The work record data 112 is a set of work record data including check presence and absence information, a work order, and a required work time obtained based on the check determination data 131. The display data 113 is a display drawing in an image format, a portable document format (PDF), or the like in which the work record data 112 is visualized on the drawing so that the work record can be easily understood by a third party.

Examples of the file format of the drawing element data 111, the work record data 112, the handwritten data 121, and the check determination data 131 include a text file and a comma separated value (CSV) file. Examples of the file format of the display data 113 include an image file such as a PDF file and a portable network graphics (PNG) file.

First Embodiment: Schematic Operation of Work Record Extraction Device 100

The handwritten data acquisition unit 120 acquires the time-series handwritten data 121 handwritten by the worker on the first terminal 10 via the data communication unit 101 from the first terminal 10 via the network at any timing, and outputs the time-series handwritten data 121 to the data collation unit 130. The handwritten data 121 may be stored in advance in the data storage unit 110 and acquired from the data storage unit 110.

The data collation unit 130 collates position coordinates between the input handwritten data 121 and the drawing element data 111 acquired from the data storage unit 110, and records a collation result as the check determination data 131. The collation mentioned here is to determine whether an area of a corresponding drawing element is overlaid by handwriting. When the area of the drawing element is overlaid, it is considered that the drawing element is checked, and when the area of the drawing element is not overlaid, it is considered that the drawing element is not checked. The generated check determination data 131 is sent to the work record generation unit 141 in the data generation unit 140.

The work record generation unit 141 rearranges the check determination results in chronological order based on the input check determination data 131. Further, the time required for each check work is calculated. The work record generation unit 141 records these results as the work record data 112 and outputs the work record data 112 to the data storage unit 110.

The display data generation unit 142 acquires the work record data 112 from the data storage unit 110. The display data generation unit 142 generates the display data 113 by extracting, based on the acquired work record data 112, a work record required by an administrator, and visualizing the extracted work record on the drawing so that the administrator can easily understand the work record, and outputs the display data 113 to the data storage unit 110.

In a case where there is a data display request from the first terminal 10 and the second terminal 200, the work record data 112 and the display data 113 are transmitted via the display control unit 102 and the data communication unit 101 to the terminal by which the request is made. The terminals display the data. At this time, the display control unit 102 selects a terminal to which data is output, and instructs the data communication unit 101 to transmit data to the selected terminal.

First Embodiment: Handwritten Data 121

Figures 3A, 3B:
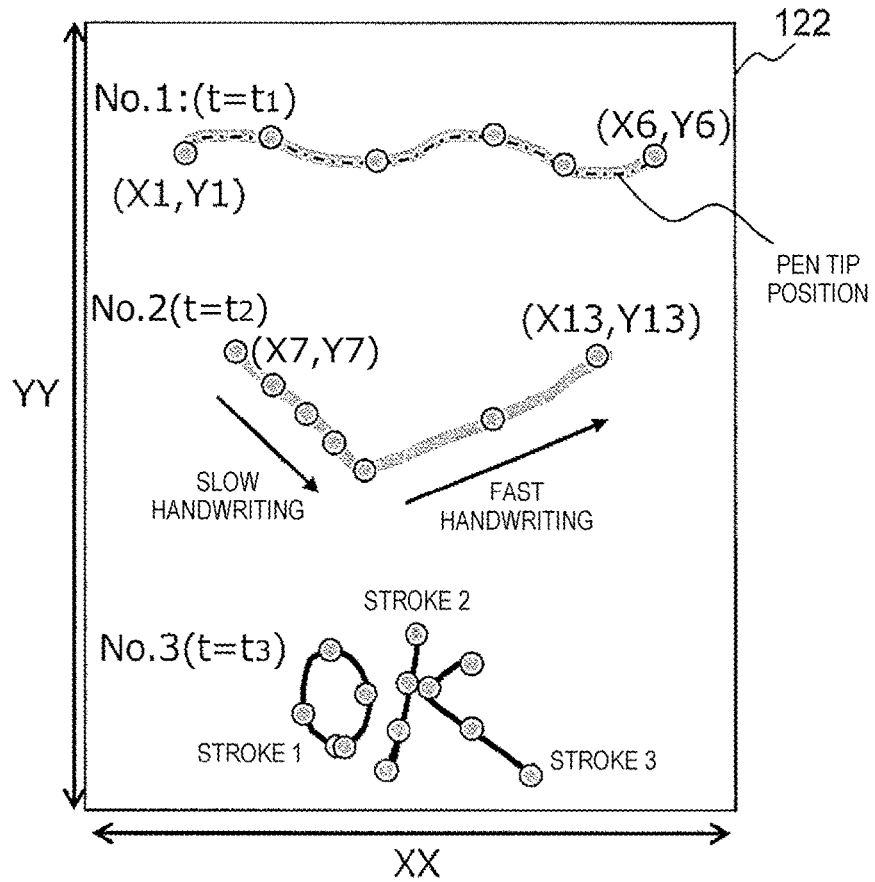
FIG. 3A shows an example of a handwriting display 122 that is a source of handwritten data 121.
FIG. 3B shows a data example of the handwritten data 121.

FIG. 3A shows an example of a handwriting display 122 that is a source of the handwritten data 121. In the following description, the first terminal 10 is regarded as the WD. As shown in FIG. 3A, the stroke indicates a one-stroke path from a time point when the worker touches the WD screen with the electronic pen to a time point when the worker moves the electronic pen away from the surface of the WD screen. As shown in the handwriting display 122, a stroke is implemented by a group of points obtained by spatially sampling the path based on position coordinates of a pen tip touching the WD. For example, one stroke shown in Ink No. 1 includes six sample points, (X1, Y1) to (X6, Y6). The ink data is a data set of strokes, and the stroke is a data set of sample points (hereinafter, referred to as points).

A sampling frequency of the WD touch panel is finite, so that the density of the point group coordinates depends on a handwriting speed of a person, and as shown in Ink No. 2, the slower the handwriting is, the higher the density is, and the faster the handwriting is, the lower the density is. A plurality of strokes written within a predetermined time after the electronic pen is moved away from the surface of the WD screen may be regarded as the same ink data. In an example shown in Ink No. 3, three strokes are set as one piece of ink data, and the strokes can be distinguished by a stroke number uniquely assigned to each stroke. In order to distinguish points included in the strokes, a unique point number may be assigned to each point.

FIG. 3B shows a data example of the handwritten data 121. The handwritten data 121 can be configured as a data table. The handwriting display 122 shown in FIG. 3A is an example including three pieces of ink data, and has time point information of t=t1, t=t2, and t=t3, and numbers of No. 1 to No. 3 are assigned in time series. Each row of the handwritten data 121 is ink data corresponding to each handwriting of No. 1 to No. 3. Each row includes a unique ink number, a handwriting generation time point of a handwritten start point, a user ID, a terminal ID, pen attributes (including a color, a width, a transmittance, and a pen type such as a marker or a pen), sample point group coordinates (hereinafter, referred to as point group coordinates) included in a stroke, and a WD resolution.

First Embodiment: Drawing Element Data 111

Figure 4A:
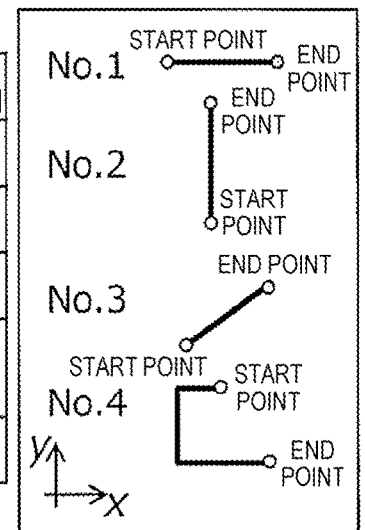
FIG. 4A is a diagram showing a data example of drawing element data 111.
Figure 4B:
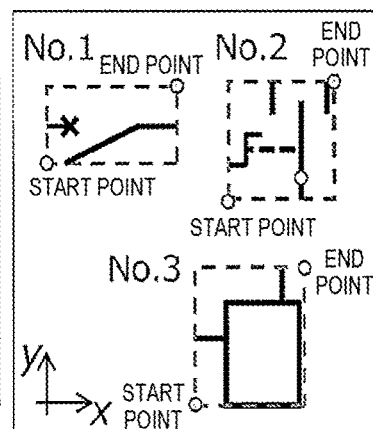
FIG. 4B is a diagram showing a data example of the drawing element data 111.
Figure 4C:
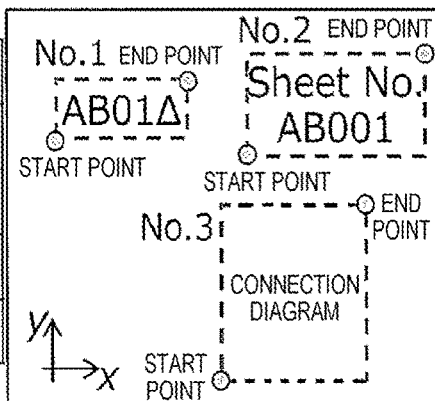
FIG. 4C is a diagram showing a data example of the drawing element data 111.

FIGS. 4A to 4C are diagrams showing data examples of the drawing element data 111. The drawing element data 111 indicates a set of data including names, coordinate information, and grouping information of elements of a wire, drawing symbols, and characters in the drawing. The wire indicates a conductive wire that connects drawing symbols included in a circuit in the drawing. The drawing symbol indicates a symbol representing a component included in a circuit (for example, an electrical drawing symbol defined by the JIS standard). The character indicates attribute information of the wire or the drawing symbol by being described in the vicinity of the wire or the drawing symbol in the circuit.

FIG. 4A shows a data example showing the wire in the drawing element data 111. Wire data 111-1 is a data example of a data table in which wires are shown. Wire display 111-A indicates drawing elements that are a source of the wire data 111-1. The rows of the wire data 111-1 show data corresponding to the wires No. 1 to No. 4 in the wire display 111-A. Each row includes a unique wire number, name, coordinates (x and y coordinates of a start point and an end point), and line information. In a case where the line information includes a plurality of coordinates (for example, the wire of No. 4 includes three lines), x and y coordinates of a start point and an end point of each line are included in the line information, and the coordinates of end points of the three lines are described as the start point and the end point in a coordinate column. In the example of FIG. 4A, the −X direction is described as the start point, and the +X direction is described as the end point (when the x coordinates are the same as in the case of the wire of No. 2, the −Y direction is described as the start point, and the +Y direction is described as the end point), and the start point and the end point may be appropriately changed depending on an origin position in the drawing. The wires connected as in No. 4 may be managed as one group, or may be managed as separate wires.

FIG. 4B shows a data example in which drawing symbols in the drawing element data 111 are shown. Drawing symbol data 111-2 is a data example of a data table in which drawing symbols are shown. Drawing symbol display 111-B indicates drawing elements that are a source of the drawing symbol data 111-2. Each row of the drawing symbol data 111-2 shows data corresponding to each of drawing symbols of No. 1 to No. 3 in the drawing symbol display 111-B. The drawing symbol includes a plurality of lines, and in order to handle the drawing symbol in units of meaningful symbols, the area is defined by diagonal coordinates of a rectangular area. FIG. 4B shows an example in which the coordinates are defined as the lower left (start point) and the upper right (end point) of the rectangular area. The positions of the start point and the end point may be appropriately changed according to an origin position in the drawing. Each row includes a unique drawing symbol number, a name, coordinates (x and y coordinates of a start point and an end point of a rectangular area), and a connection direction with a wire. The connection directions with the wires are respectively described as the "x direction" and the "y direction" in the case of one direction as in No. 1 and No. 2. In a case where there is a connection relationship in both the x direction and the y direction as in No. 3, the connection direction of the wire is described as the "x-y direction". The information on the connection direction of the wire may include a relationship between an input and an output, and for example, in a case where "x-y direction" is shown, x may indicate an input and y may indicate an output.

FIG. 4C shows a data example in which characters in the drawing element data 111 are shown. Character data 111-3 is a data example of a data table in which characters are shown. Character display 111-C indicates characters that are a source of the character data 111-3. Each row of the character data 111-3 shows data generated for each of characters of No. 1 to No. 3 in the character display 111-C. Since a character is handled in units of meaningful character information, the area is defined by diagonal coordinates of a rectangular area. In FIG. 4C, the coordinates are defined by x and y coordinates of the lower left (start point) and the upper right (end point) of the rectangular area. The positions of the start point and the end point may be appropriately changed according to an origin position in the drawing. Each row includes a unique character number, a name, coordinates (x and y coordinates of a rectangular area), and a direction of a character string. The direction of the character string is the x direction for No. 1 and No. 2, and the y direction for No. 3.

A direction is described for each drawing element, so that a direction of a unit width to be described later can be set based on the direction of the drawing element. For example, in the case of a drawing symbol, when checking the drawing symbol, the worker paints on an area by handwriting along a connection direction between a wire and a drawing symbol, so that a division direction of a unit width can be horizontal relative to the connection direction. In the case of a character, the worker paints on an area by handwriting along a direction in which the character is read, so that the division direction can be horizontal relative to a direction of the character string.

As will be described later, even in a case where the wire extends in an oblique direction, the wire and the drawing symbol (or the wire and the character string) are connected in any of the x and y directions in most cases. In particular, this tendency is remarkable in the circuit drawings. Therefore, in the invention, it is assumed that the connection direction is any one of the x and y directions.

First Embodiment: Operation of Data Collation Unit 130

Figure 5:
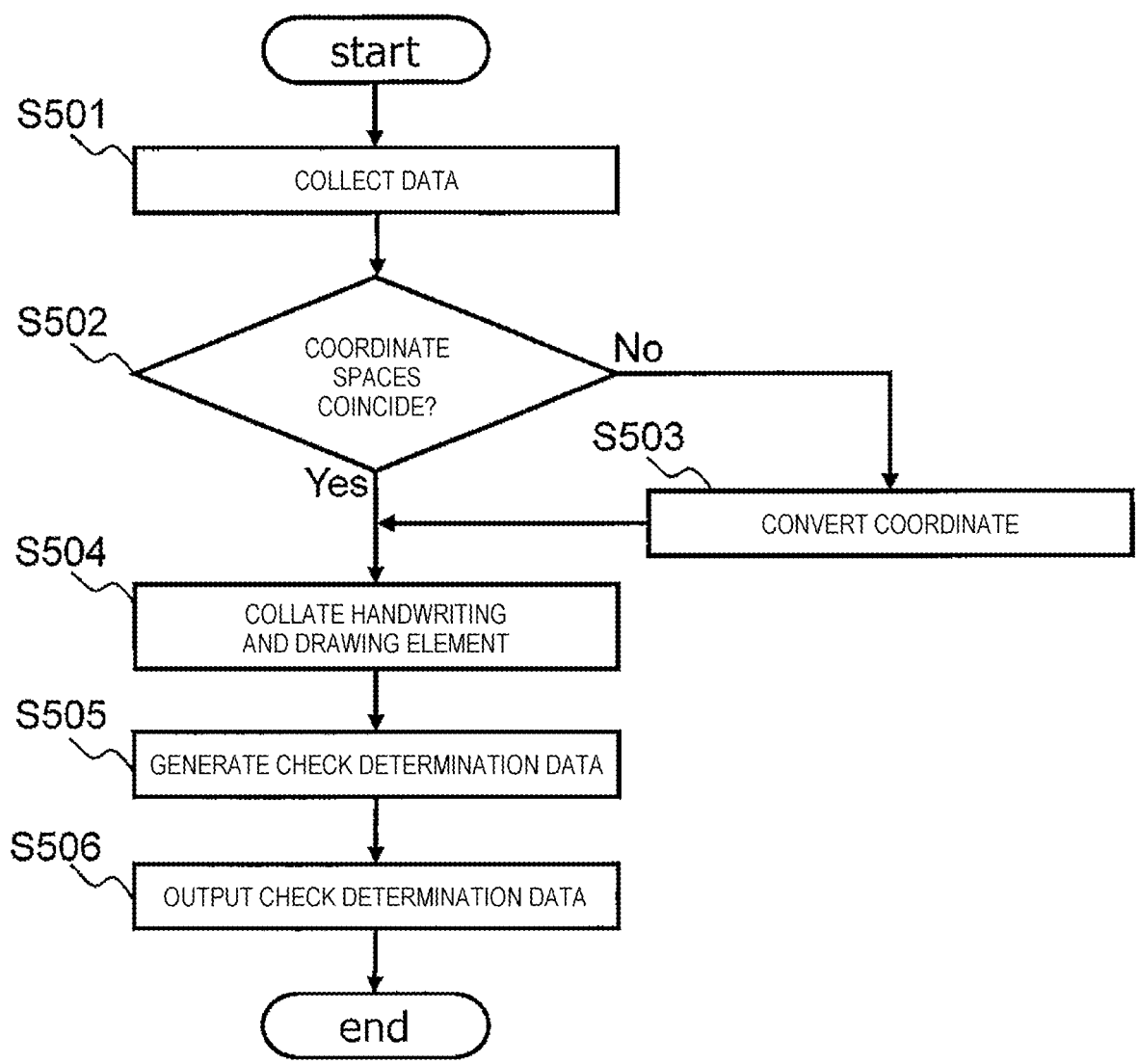
FIG. 5 is a flowchart showing operations of a data collation unit 130.

FIG. 5 is a flowchart illustrating operations of the data collation unit 130. First, the overall flow will be described, and then the details of each step will be described. The data collation unit 130 acquires the handwritten data 121 from the handwritten data acquisition unit 120 and acquires the corresponding drawing element data 111 from the data storage unit 110 (S501). The data collation unit 130 checks whether a coordinate space (the resolution of WD) of the handwritten data 121 and a coordinate space (the resolution of a drawing file) of the drawing element data 111 coincide with each other (S502). If the coordinate spaces do not coincide with each other, one coordinate space is converted so as to match the other coordinate space so that both resolutions coincide with each other (S503). The data collation unit 130 collates point group coordinates of each of strokes of the handwritten data 121 with position coordinates of the drawing element data 111 to determine whether the drawing element is checked (S504). After the determination, the data collation unit 130 generates the check determination data 131 as the determination result (S505), and outputs the check determination data 131 to the data generation unit 140 (S506).

A method of coordinate conversion in S503 will be described. In a case where the resolution of the WD and the resolution of the drawing file do not coincide with each other, both the coordinate spaces are different from each other, so that the position coordinates cannot be correctly collated in S504. In this case, the data collation unit 130 is required to convert one coordinate space in accordance with the other coordinate space so that both resolutions coincide with each other. The conversion method will be specifically described below.

The number of pixels in the X direction and the number of pixels in the Y direction of the resolution of WD on which handwriting is performed (for example, the number of pixels in the case of the tablet and the number of dots in the case of the electronic paper) are respectively defined as Xwd and Ywd, and the number of pixels in the X direction and the number of pixels in the Y direction of the resolution of the drawing data are respectively defined as Xdd and Ydd. For example, in a case where the coordinate space of the handwritten data 121 matches with the coordinate space of the drawing element data 111, assuming that the respective origins coincide with each other, the coordinates can be calculated as $Xc=(Xdd/Xwd) \times Xhw$, and $Yc=(Ydd/Ywd) \times Yhw$ in which Xhw and Yhw respectively represent an X coordinate and a Y coordinate before the coordinate conversion of the handwritten data 121, and Xc and Yc respectively represent an X coordinate and a Y coordinate after the coordinate conversion. In a case where the origins are different from each other, for example, when the coordinate space of the handwritten data 121 has an upper left origin on the screen and the coordinate space of the drawing element data 111 has a lower left origin on the screen, it is necessary to perform coordinate conversion so as to invert the coordinate space in the Y direction. In this case, Yc can be calculated as $Yc=(Ydd/Ywd) \times (Ywd-Yhw)$.

A collation method in S504 between the point group coordinates of each stroke of the handwritten data 121 and the element coordinates of the drawing element data 111 will be described. By collating the handwritten data 121 with the drawing element data 111 based on the position coordinates, the information on whether the corresponding drawing element is checked can be extracted. In addition, the checked time point information can be extracted based on the time point information in the handwritten data 121. Hereinafter, collation methods for a wire, a drawing symbol, and a character will be described.

In the invention, a boundary area is provided for collation with point group coordinates included in a stroke of the handwritten data 121 based on coordinates of a start point and an end point in the drawing element data 111. The boundary area refers to a rectangular area provided around each drawing element. The boundary area is divided in either the horizontal direction or the vertical direction of the boundary area. A length set in the division direction is defined as a unit width, and a length set in a direction other than the division direction is defined as an allowable width. Details of a method for setting the allowable width and the unit width will be described later. The allowable width is set in a direction perpendicular to the direction of the drawing element, and the unit width is set in a direction horizontal to the direction of the drawing element. For example, in the case of a wire, the allowable width is set in a direction perpendicular to an extending direction, and the unit width is set in a horizontal direction. In the case of a drawing symbol, the allowable width is set in a direction perpendicular to the connection direction between the drawing symbol and the wire, and the unit width is set in a horizontal direction. In the case of a character, the allowable width is set in a direction perpendicular to a direction of the character string, and the unit width is set in a horizontal direction.

Figure 6A:
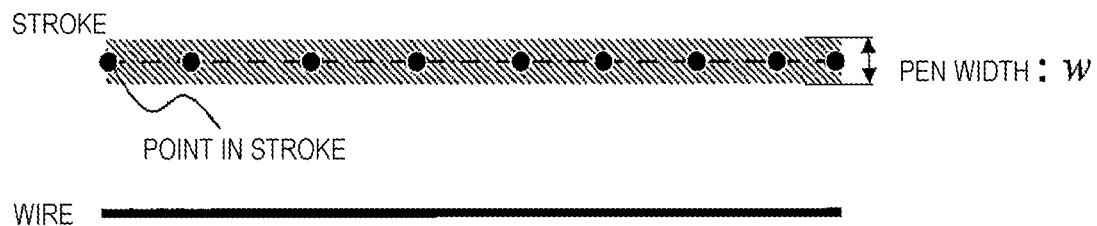
FIG. 6A is a diagram showing an allowable width set to provide a boundary area.
Figure 6B:
FIG. 6B is a diagram showing an allowable width set to provide the boundary area.
Figure 6C:
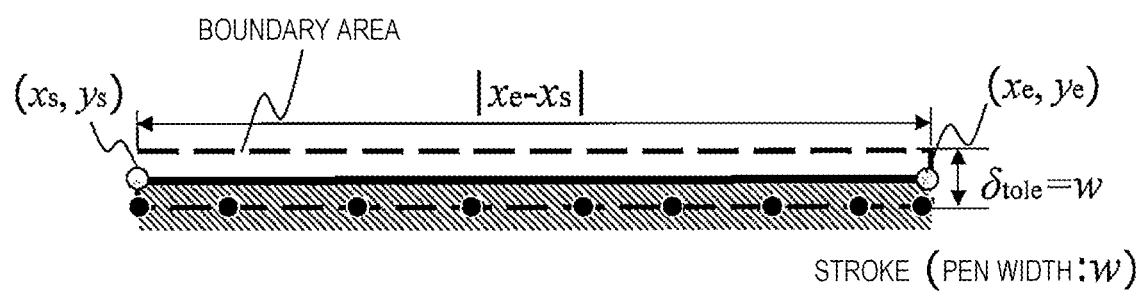
FIG. 6C is a diagram showing an allowable width set to provide the boundary area.

FIGS. 6A to 6C are diagrams illustrating an allowable width set for providing a boundary area. Here, a wire will be described as an example of a drawing element. FIG. 6A shows an example in which it is considered that the wire is not checked based on a position relationship between the stroke and the wiring, FIG. 6B shows an example in which it is considered that the wire is checked based on a positional relationship between the stroke and the wire, and FIG. 6C shows an example of setting the allowable width for providing the boundary area.

The worker leaves a work record by handwriting on an area of a drawing element corresponding to a portion in the drawing where the check work was performed. As shown in FIG. 6A, in a case where the stroke and the wire are greatly separated from each other, the stroke does not overlap the area of the drawing element (the wire in this example), so that it is considered that the drawing element is not checked by the data collation unit 130. As shown in FIG. 6B, in a case where the stroke overlaps the area of the drawing element, it is considered that the drawing element is checked.

The allowable width is set to determine whether the drawing element is checked in a case where there is a handwriting deviation which substantially occurs in a direction perpendicular to the direction of the drawing element. As for sizes of a rectangle of the boundary area, a size in one of the horizontal direction and the vertical direction is the length of the allowable width, and a size in the other direction is the length of the drawing element. A setting direction of the allowable width is set based on the direction of the drawing element as described above. For example, in the case of the wire in the horizontal direction shown in FIG. 6C, a length in the direction perpendicular to the boundary area is the allowable width, and a length in the horizontal direction is the wire length. That is, when the coordinates of the start point and the end point are respectively (xs, ys) and (xe, ye), the horizontal size of the boundary area is |xe−xs|. The length of the allowable width is appropriately set within a pen width that can be set on the work terminal by the worker. Different values may be used for each drawing element (a wire, a drawing symbol, or a character).

The pen width mentioned here is a spot size of a virtual pen device virtually generated on the work terminal. For example, when the worker touches the screen of the work terminal, a virtual pen device is generated on the application, and a tip end of the pen device moves along a touch position of the worker. A size of the tip end corresponds to the pen width (or spot size) of the virtual pen device used for inputting the handwritten data.

When a point in the stroke is included in the boundary area, the data collation unit 130 determines that the drawing element having the boundary area is checked, and when the stroke is not included in the boundary area, the data collation unit 130 determines that the drawing element having the boundary area is not checked. By setting the length of the allowable width to the pen width, a deviation in the vertical direction from the drawing element to a lower end or an upper end of the pen width can be allowed. For example, FIG. 6C shows a state in which the pen width is set to w and a line is drawn such that the upper end of the stroke line width overlaps the drawing element. By determine the length Stole of the allowable width as the pen width w, the point in the stroke is included in the boundary area set for the drawing element. Therefore, it can be determined that the drawing element is checked.

In the case of the drawing symbol and the character, the size of the allowable width is a value including the length of a drawing element (Lx in the x direction and Ly in the y direction) in addition to a component of the pen width described above. The length of the drawing element can be calculated from the coordinates of the start point and the end point of the rectangular area. For example, when the pen width is defined as w, and the coordinates of the start point and the end point are respectively defined as (xs, ys) and (xe, ye), $\delta tole = w + L\varphi = w + |ye - ys|$ is satisfied in the case of the allowable width in the y direction. In the case of the allowable width in the x direction, $\delta tole = w + Lx = w + |xe - xs|$.

By providing the allowable width as described above, when it is determined whether the drawing element is checked from the handwriting of the worker, it is considered that the drawing element is not checked in a case where the handwriting is largely deviated from the drawing element, and the handwriting deviation of the worker in the direction perpendicular to the direction of the drawing element can be allowed.

In a case where the drawing element is a wire (or a straight line), an allowable width may be set in a direction perpendicular to an extending direction thereof (a vertical direction in FIGS. 6A to 6C), and a unit width to be described later may be set along the extending direction. A case where the drawing element is a drawing symbol or a character string will be described later using a connection direction with the wire. The data collation unit 130 can acquire these directions as "direction data".

Next, the unit width will be described in detail. In an actual handwriting of a person, there is not only a handwriting deviation in a direction perpendicular to a direction of a drawing element but also a handwriting deviation that is unique to a person and is locally and largely deviated. A stroke that is locally and largely deviated may be included in a boundary area provided in another drawing element different from the drawing element to be checked. Therefore, in the invention, in addition to the allowable width, a unit width is set in a direction horizontal to the direction of the drawing element, and the boundary area is divided into the unit width, so that whether an element is checked can be correctly determined even when a handwriting deviation that is unique to a person and is locally deviated occurs.

FIGS. 7A and 7B are diagrams illustrating a unit width set to divide a boundary area. FIG. 7A shows an example in which a check determination is erroneously made due to a handwriting deviation that is locally and largely deviated. FIG. 7B shows a method for performing correct check determination by dividing a boundary area by providing a unit width. Here, an example in which the unit width is set for a wire is shown.

In FIG. 7A, a wire 1 and a wire 2 are close to each other, a stroke used by the worker to check the wire 1 is locally and largely deviated due to the handwriting deviation, and a part of the stroke unintentionally is included in a boundary area of the wire 2 from the outside. In this case, it is correct to determine that the wire 1 is checked, and to determine that the wire 2 is not checked because handwriting is overlaid only locally on an area of the wire. However, when a boundary area having only an allowable width is used in the wire 2, the point in the stroke is included in the boundary area, and thus it is erroneously determined that the check is performed.

In order to avoid such erroneous determination, in addition to the allowable width, the unit width is set in the direction horizontal to the direction of the drawing element, and the boundary area is divided into the unit width. By determining whether a point in a stroke is included in each unit width in the entire boundary area, check determination can be correctly performed even in a case where there is a stroke locally included in a boundary area of another drawing element due to a handwriting deviation. Specifically, when the number of unit widths in the entire boundary area is defined as Nunit, the number of unit widths in which a point in a stroke is included in a divided area is defined as N, and a determination threshold value is defined as Th_check, the data collation unit 130 determines the presence or absence of a check based on a determination formula of the determination threshold value (when N/Nunit≥Th_check is satisfied, it is considered that a check is performed).

The severity of the check determination for the handwriting deviation can be dynamically determined by the determination threshold value. That is, as the determination threshold value is increased, it is not determined that a check is performed unless the overlap of the stroke to the drawing element is increased. On the other hand, as the determination threshold value is decreased, even if the overlap of the stroke to the drawing element is small, it can be considered as the check determination.

The determination threshold value can be set to any value between 0 and 1. In a case where the worker paints half or more area of a drawing element by handwriting in an actual use environment, there is a high possibility that the drawing element is checked. Therefore, assuming that the minimum value of Th_check is 0.5, it is effective to determine that a check is performed in a case where a point in a stroke is included in half or more of the unit width included in the boundary area.

FIG. 7B shows an example of a determination procedure using the unit width. The boundary area of each of the wire 1 and the wire 2 is divided into six unit widths in the horizontal direction. For example, the determination threshold value Th_check is set to 0.5. In the wire 1, N/Nunit=5/6≈0.83≥Th_check=0.5, and the determination formula is satisfied, so that it can be determined that the drawing element is checked. In the wire 2, N/Nunit=1/6≈0.17<Th_check=0.5, and the determination formula is not satisfied, so that it can be determined that the drawing element is not checked.

In a case where the determination formula is satisfied, the information on a check time point can be attached based on the information on a time point at which the stroke is generated. For example, as shown in FIG. 7B, when a stroke used for checking the wire 1 is generated at a time point t=t1, it can be considered that the wire 1 is checked at the time point t1, and thus information on the check time point t=t1 can be attached.

Regarding the check time point, in a case where a plurality of strokes (for example, two handwritten strokes generated at t=t2 and t=t5) are applied on an area of one drawing element, it is preferable to set a generation time point of a stroke having a larger number of points included in a boundary area as the check time point. This is because there is a high possibility that the stroke having a large number of points included in the boundary area is handwritten for checking the drawing element.

Regarding the determination method, in a case of a wire including group information implemented by a plurality of horizontal lines and vertical lines, such as a L-shaped wire and a U-shaped wire, a ratio (N_total/Nunit_total) of the respective sums of N and Nunit of the constituted lines may be taken, and the check determination may be performed on the entire wire including the group information (that is, the L-shaped wire or the U-shaped wire is maintained).

Figure 8A:
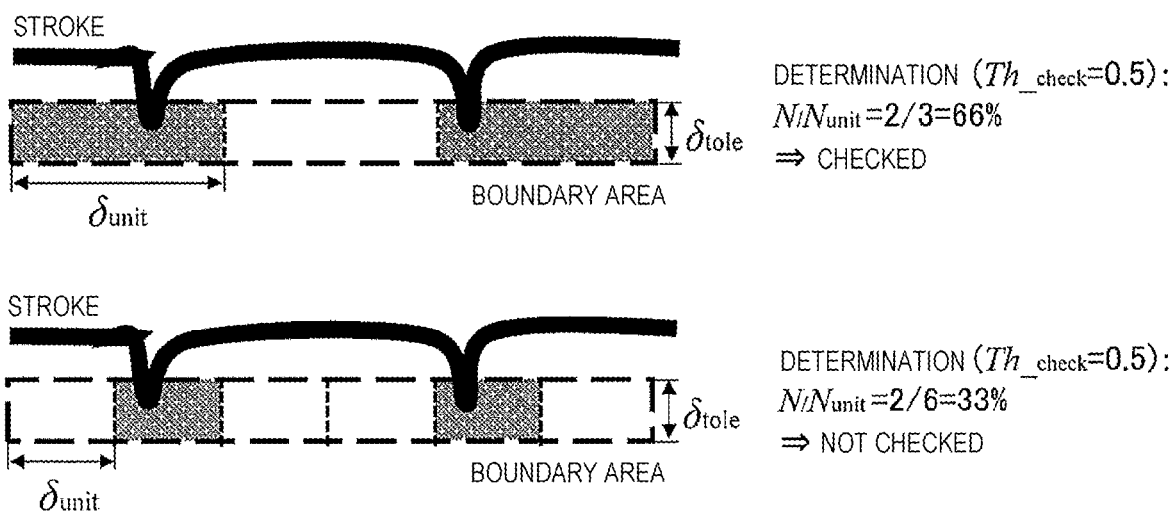
FIG. 8A is a diagram illustrating an advantage obtained by increasing the number of divisions based on a unit width.
Figure 8B:
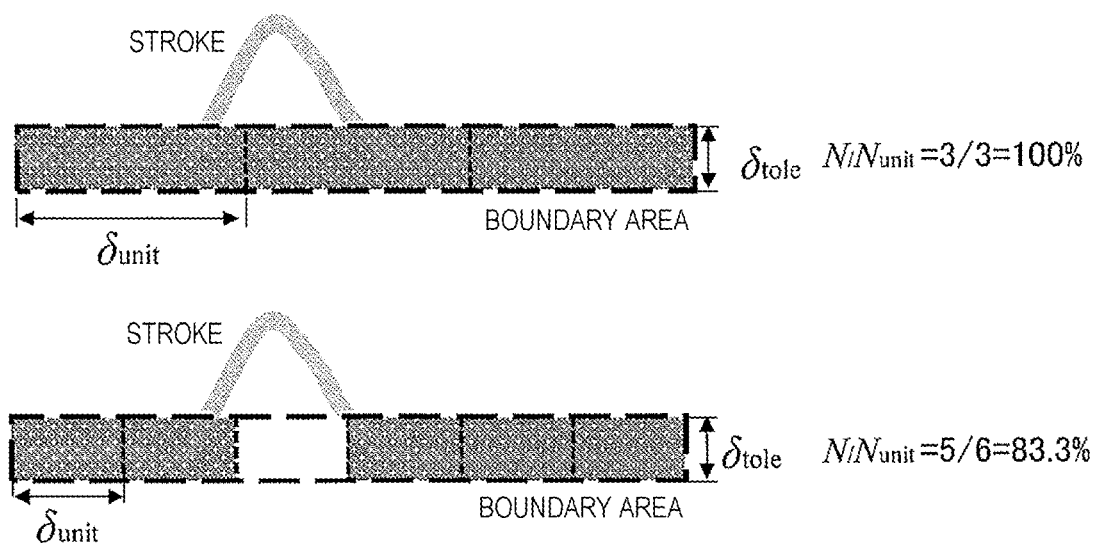
FIG. 8B is a diagram illustrating the advantage obtained by increasing the number of divisions based on the unit width.

FIGS. 8A and 8B are diagrams illustrating an advantage obtained by increasing the number of divisions based on a unit width. As the number of divisions based on the unit width is increased, the determination can be performed accurately. FIG. 8A is a diagram showing an example of preventing erroneous determination by increasing the number of divisions in a case where a stroke is locally included as noise from the outside due to a handwriting deviation in a boundary area divided for each unit width. FIG. 8B is a diagram showing an example in which the N/Nunit used for the check determination can be expressed more accurately in a case where the stroke is locally and largely deviated relative to the divided boundary area.

As shown in FIG. 8A, in a case where a stroke is unintentionally included from the outside of the boundary area (for example, a dot of only one point where the electronic pen tip is placed or handwriting in which only a part of the drawing element is overlapped by writing a memo), when the determination threshold value is set to 0.5, the determination formula is satisfied in a case where the number of divisions is small as shown in the upper side of FIG. 8A. Therefore, it is incorrectly determined that a check is performed. In contrast, in a case where the number of divisions is increased as shown in the lower side of FIG. 8A, a ratio of the number of the division boundary areas including noise to the number of divisions is reduced, and thus it is correctly determined that a check is not performed. By increasing the number of divisions in this manner, a check determination robust against noise is enabled.

As shown in FIG. 8B, in a case where a stroke is largely deviated by a part from the inside of a boundary area, handwritten point groups are included in a boundary area divided into three unit widths in a case where the number of divisions is small as shown in the upper side of FIG. 8B, so that N/Nunit=3/3=100%. However, N/Nunit=100% does not express a state where handwriting is locally and largely deviated, and it cannot be said that a result of collation with actual handwriting is accurately expressed. On the other hand, in a case where the number of divisions is increased as shown in the lower side of FIG. 8B, N/Nunit=⅚=83%, and a state in which a part is largely deviated can be expressed.

By increasing the number of divisions and accurately representing the state of the stroke used for the check in this manner, a feature of the person who performs handwriting can be extracted, and the determination threshold value can be optimized for each worker. By performing optimization for each worker, the intention of each worker to check the drawing element can be more accurately reflected in a final work record.

Next, a method for determining a length of the unit width will be described. As described above, the reason why the unit width is provided lies in that, by dividing a boundary area provided in a drawing element for each unit width, a check is allowed to be performed in a case where the stroke is locally and largely deviated, and on the other hand, it can be determined that the check is not performed in a case where the stroke is not overlaid by handwriting so as to overlap an area of the drawing element or in a case where there is unintended noise. Therefore, it is effective to set the unit width to a length that allows the boundary area to be divided into two or more.

As a method for determining a unit width for dividing a drawing element into two or more, a half value of a minimum value among lengths of all drawing elements included in the drawing may be used. This is because all the drawing elements can be divided into at least two areas if the unit width is half the minimum width of all the drawing elements included in the drawing. The minimum width is detected based on the coordinates of the drawing element data included in the drawing element data 111. The minimum width may be different in the x direction and the y direction, and the minimum width may be separately detected for a wire, a drawing symbol, or a character, and may be used as a unit width for each.

When the unit width is set to the minimum width, in order to include at least one point of point groups of a stroke in each divided area, it is necessary to follow a conditional expression calculated based on a stroke speed of the worker and a sampling frequency of WD. When the maximum stroke speed of the worker is defined as Vmax and the sampling frequency of WD is defined as fs, a conditional expression satisfies unit width $\delta$unit≥Vmax/fs. As a numerical value example, according to the JIS standard (JIS Z 8313-5) of the drawing for work, the smallest character size is specified as 1.8 mm (height direction). According to this value, the unit width $\delta$unit required to divide the drawing element into at least two or more can be calculated as 0.9 mm. The sampling frequency of the WD satisfying $\delta$unit=0.9 mm is fs≥344.1 using 0.31 mm/msec which is an actually measured Vmax. That is, it is possible to calculate that the WD having sampling performance of about 344 Hz or more is necessary.

FIGS. 7A and 7B show the example of setting the allowable width and the unit width of the boundary area for the wire parallel to the horizontal direction (x direction) as an example, and a method for setting the allowable width and the unit width for an obliquely inclined wire will be described next.

Figure 9A:
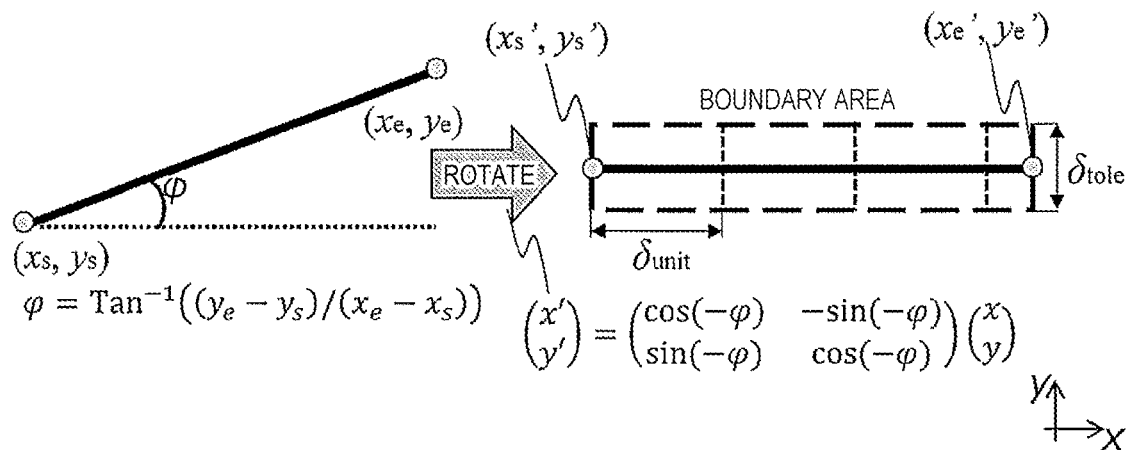
FIG. 9A is a diagram showing an example of a method of setting an allowable width and a unit width in an obliquely inclined wire.
Figure 9B:
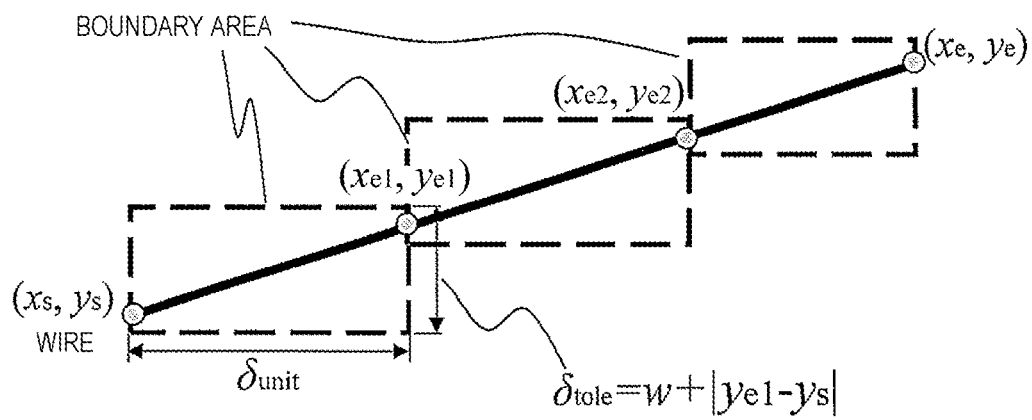
FIG. 9B is a diagram showing the example of the method of setting an allowable width and a unit width in an obliquely inclined wire.
Figure 9C:
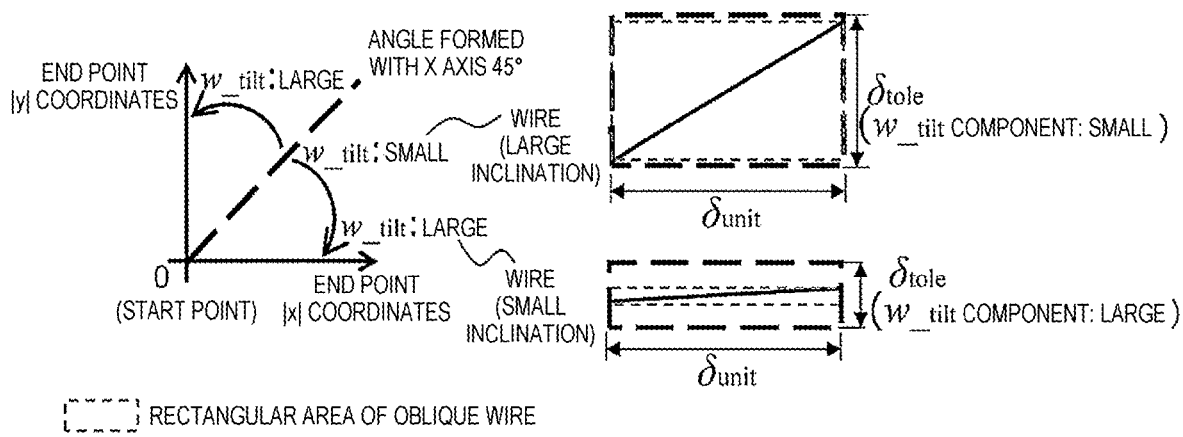
FIG. 9C is a diagram showing the example of the method of setting an allowable width and a unit width in an obliquely inclined wire.

FIGS. 9A to 9C are diagrams showing an example of a method for setting an allowable width and a unit width of an obliquely inclined wire. FIG. 9A shows an example in which the allowable width and the unit width are set after the obliquely inclined wire is rotated so as to be horizontal relative to the x axis. FIG. 9B shows an example in which the allowable width and the unit width are set without rotating the wire in order to reduce the complexity of calculation. FIG. 9C shows an example in which a pen width component included in the allowable width is changed according to the inclination.

In the case where the wire is not horizontal or vertical but is inclined obliquely as shown in FIG. 9A, providing the allowable width and the unit width in an oblique direction in the orthogonal coordinates complicates the processing. Therefore, after the coordinates are rotated to be horizontal to the x axis, the unit width and the allowable width are set by the same method as that of the horizontal wire described above. An angle $\varphi$ formed by the oblique wire and the x axis can be calculated as $\varphi=\tan^{-1}((ye-ys)/(xe-xs))$ using the x and y coordinates of a start point and an end point. With a rotation matrix shown in FIG. 9A, the oblique wire is rotated to be horizontal to the x axis. The point group coordinates in the stroke included in the handwritten data 121 are also rotated by the same angle with the same rotation matrix, and the position coordinates are collated between the stroke and the wire.

In FIG. 9A, the same determination as the allowable width and the unit width described above is enabled by rotating the drawing elements, but it is necessary to perform the rotation calculation of a coordinate system every time the drawing elements are collated, and the complexity of calculation may increase. Therefore, as shown in FIG. 9B, when a method for appropriately setting the allowable width and the unit width between the respective coordinates without rotating the coordinate system is used, there is an advantage that the complexity of calculation can be reduced.

FIG. 9B is a diagram showing a method in which an allowable width and a unit width are appropriately set between the respective coordinates without rotating the coordinate system, and boundary areas are provided in a stepwise manner. In the case of an oblique wire that is long in the x direction, the allowable width is set in the y direction, and the unit width is set in the x direction. In the case of an oblique wire that is long in the y direction, the allowable width is set in the x direction, and the unit width is set in the y direction.

FIG. 9B shows an example in which a boundary area is divided into three boundary areas by a unit width relative to the oblique wire that is long in the x direction, and the boundary areas are provided in a stepped manner. The x and y coordinates of the start point and the end point are respectively (xs, ys) and (xe, ye). The x and y coordinates of positions which are included between the start point and the end point and in which the boundary area is divided are respectively (xe1, ye1) and (xe2, ye2). Using the pen width w and the y coordinates of the start point and the end point of each area, the allowable width of each area is calculated as, for example, $\delta$tole=w+|ye1−ys| in the case of the oblique wire that is long in the x direction. In the case of the oblique wire that is long in the y direction, $\delta$tole=w+|xe1−xs| is satisfied.

In the case of the oblique wire, since the worker draws a line obliquely along the extending direction, as an angle formed by the x-axis and the wire approaches 45°, a more correct allowable width is obtained in which the pen width component is smaller. Therefore, as shown in FIG. 9C, instead of w, w_tilt whose magnitude changes according to the inclination may be used as the pen width component included in the allowable width. The w_tilt can be calculated as $w\_tilt=w\times(45°-\tan^{-1}(|ye-ys|/|xe-xs|))/45°$. The w_tilt decreases as the angle formed by the wire and the x axis approaches 45°, and increases as the angle is away from 45°.

As shown in the upper right part of FIG. 9C, in a case where the angle formed by the wire and the x axis approaches 45°, a part (|xe−xs| or |ye−ys|) formed by the difference between the coordinates in the size of the boundary area is relatively large. Therefore, it is not necessary to further ensure a large pen width component w_tilt, so that w_tilt may be small. This indicates that a thick dotted-line rectangle and a thin dotted-line rectangle on the upper right of FIG. 9C have substantially the same size. As shown in the lower right part of FIG. 9C, when the angle formed by the wire and the x axis is away from 45°, a part (|xe−xs| or |ye−ys|) formed by the difference between the coordinates in the size of the boundary area becomes relatively small. Therefore, in order to ensure the same degree of determination accuracy as the upper right in FIG. 9C, it is necessary to ensure a large pen width component w_tilt. This indicates that a size of a thick dotted-line rectangle and a size of a thin dotted-line rectangle are largely different from each other at the lower right of FIG. 9C.

Figure 10C:
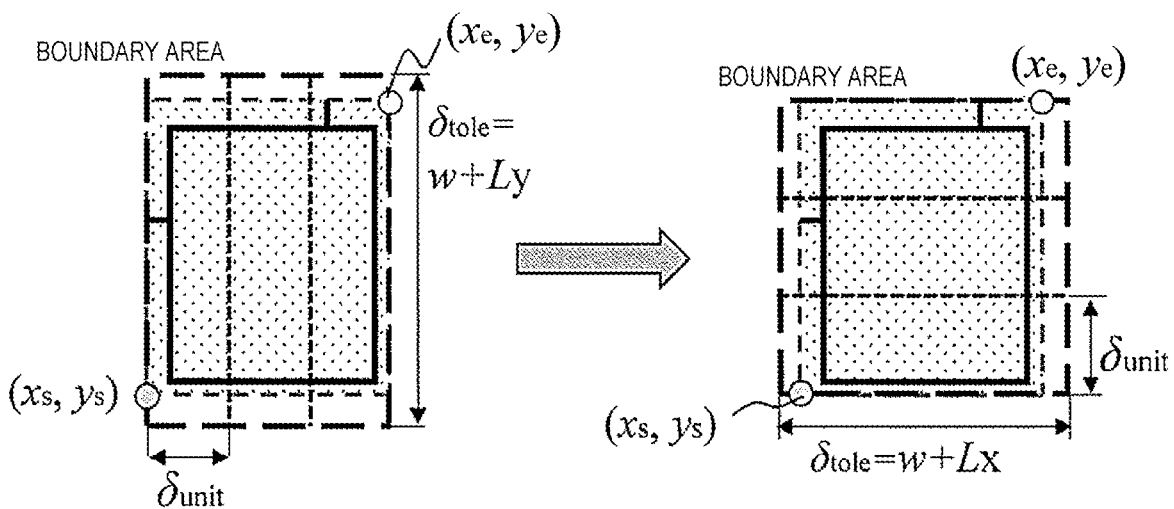
FIG. 10C shows an example in which an allowable width and a unit width are set for a drawing symbol.

FIGS. 10A to 10C show an example in which an allowable width and a unit width are set for the drawing symbols. FIG. 10A shows an example of a case where a connection direction with the wire is the x direction. FIG. 10B shows an example of a case where the connection direction with the wire is the y direction. FIG. 10C shows an example of a case where the connection direction with the wire is present in both the x direction and the y direction.

In a case where an area of a drawing symbol is checked by handwriting on the WD, a line is often drawn on the area of the corresponding part along a direction in which the drawing symbol and the wire are connected, so that the allowable width and the unit width are set by utilizing the information on the connection direction with the wire in the drawing symbol data 111-2. The connection direction shown by the drawing symbol data 111-2 corresponds to "direction data" of the drawing symbol. The same also applies to a character string direction to be described later.

FIG. 10A shows a method for setting a drawing symbol representing a breaker. In this case, the wire is connected in the x direction, and the worker tends to draw a line on an area of the breaker along the x direction. Therefore, the allowable width is set in the y direction and the unit width is set in the x direction. The allowable width is defined as δtole=w+Ly using the pen width w used for handwriting and a length Ly of the drawing element in the y direction.

FIG. 10B shows a method for setting a drawing symbol representing a Change-over switch. In this case, the wire is connected in the y direction, and the worker tends to draw a line on an area of the Change-over switch in parallel with the y direction. Therefore, the allowable width is set in the x direction and the unit width is set in the y direction. The allowable width is defined as δtole=w+Lx by using the pen width w used for handwriting and a length Lx of the drawing element in the x direction.

FIG. 10C shows an example in which drawing symbols and wires are connected in the x direction and the y direction. Depending on the type of the drawing symbol, the connection may be made in both the x direction and the y direction as shown in FIG. 10C. In this case, a method is suitable in which an allowable width is set in the y direction and a unit width is set in the x direction first to use a determination formula, and in a case where the determination formula is not satisfied, an allowable width is set in the x direction and a unit width is set in the y direction to use a determination formula.

Since the check determination method according to the invention uses the boundary area divided into the allowable width and the unit width, it is possible to cope with other check methods in addition to drawing a line on the area of the drawing symbol. For example, even in the case of using a check method such as enclosing the rectangular area of the drawing symbol with a square, filling the area, or writing a check mark in the rectangular area, whether the worker checks the drawing symbol can be determined.

Next, a method for setting an allowable width and a unit width for a character will be described. In actual work, an area of a character in the vicinity of a wire and a drawing symbol that are checked may be overlaid with a stroke. In this case, the stroke is often drawn on an area of the corresponding part along the character string direction. Therefore, by utilizing the character string direction in the character data 111-3, the allowable width and the unit width are set by the same method as the drawing symbol.

Regarding the collation method, the collation is performed after drawing elements to be collated are narrowed down based on position coordinates of the stroke in advance, so that the collation can be speeded up. In a case where all the point groups included in all the strokes are collated with all the drawing elements included in the drawing element data 111 in a round-robin manner, it may take time in a case where the number of strokes and the number of drawing elements are large. Therefore, when the position coordinates of the handwritten data 121 and the drawing element data 111 are collated, drawing elements to be collated may be narrowed down as preprocessing.

FIG. 11 is a diagram illustrating a method for narrowing down drawing elements to be collated. FIG. 11 shows drawing elements to be collated with strokes in FIG. 11. As shown in FIG. 11, an area of a circumscribed rectangle indicated by a one-dot chain line is detected from the position coordinates of the stroke, and a drawing element including at least a partial area of the circumscribed rectangle is narrowed down as a collation drawing element. Accordingly, the drawing elements to be checked and determined can be narrowed down, and the speed of the collation processing can be increased.

First Embodiment: Check Determination Data 131

Next, the check determination data 131 in the generation of the check determination data (S505) after the step of collating the handwritten data 121 with the drawing element data 111 (S504) will be described.

FIG. 12 shows a data table showing a configuration and a data example of the check determination data 131. The check determination data 131 shows a check determination result obtained by collating the position coordinates of the drawing element with position coordinates of the handwritten data on the WD.

Each row of the check determination data 131 includes a type, a name, and coordinates (x and y coordinates of a start point and an end point) of the collated drawing element, the number N of unit widths in which points in the stroke are included, the number Nunit of unit widths of the entire boundary area, a ratio (N/Nunit), a determination result based on the determination formula (in the example of FIG. 12, the determination threshold value Th_check=0.5 is set, and a case where a check is performed is described as "check", and a case where a check is not performed is described as "pass"), a check time point, the ink number, the stroke number, and the first point number used to check the drawing element in the stroke. The items of the check determination data 131 may be changed as necessary, and not all the illustrated items need to be included. In addition, other items (not illustrated), for example, a checked drawing name, and a page number, may be included.

One stroke may pass through a plurality of drawing elements. For example, it is assumed that one stroke passes through a wire, a switch, and an IC in this order. In this case, among sample points constituting the stroke, a sample point that first passes through the wire is a relatively front sample point in the stroke, and a sample point that first passes through the IC is a relatively rear sample point. In this way, a sample point that first passes through the drawing element is different for each drawing element. The point number represents the number of the first sample point. The work order can be specified by aligning records of the check determination data 131 using the point numbers.

In the check determination data 131, a handwriting number, a stroke number, and a point number are managed for each collated drawing element. Accordingly, when the work record generation unit 141 generates the work record data 112 in chronological order based on the check determination data 131, the work record generation unit 141 can rearrange the work record data 112 in chronological order with a unique order even in a case where a plurality of drawing elements are checked with one stroke.

In a case where no point in the stroke is included in the boundary area, the check time point information is not attached based on the stroke generation time point, so that the check time point, the ink number, the stroke number, and the point number are described as blank or "-".

First Embodiment: Operations of Work Record Generation Unit 141

FIG. 13 is a flowchart illustrating operations of the work record generation unit 141. First, the entire flow will be described, and then each step will be described. When the check determination data 131 is input by the data collation unit 130, the work record generation unit 141 rearranges the check determination data 131 in chronological order (S1301), calculates the time required for each work based on the check time point information (S1302), and generates the work record data 112 (S1303). The work record generation unit 141 outputs the generated work record data 112 to the data storage unit 110 (S1304).

A method for rearranging the determination results based on the check determination data 131 in S1301 in chronological order will be described. In the check determination data 131, an ink number, a stroke number, and a point number are managed for each collated drawing element based on information on the handwriting overlapping the drawing element. The rows of the drawing elements of the check determination data 131 are sorted in ascending order of the ink numbers, and the stroke numbers in the ink numbers and the point numbers in the stroke numbers are rearranged in ascending order, so that the determination result of the check work can be converted into time-series data. Since the time-series data of the work means the work order, the check order information on the drawing elements can be attached to the work record data 112.

A method for calculating the time required for the check work of the drawing elements in S1302 will be described. The time required for the check work can be calculated from a difference between check time points included in two successive pieces of check data in the check determination data 131 rearranged in chronological order. For example, in a case where a check time point of the drawing element 1 is t1 and a check time point of the drawing element 2 is t2, the time required to check the drawing element 2 is t2−t1. It is not always necessary to calculate the check time points of the two consecutive check data, and the check time points may be calculated by narrowing down the drawing elements (for example, only the wire and the drawing symbol) depending on the use for the person who confirms the work record.

FIGS. 14A and 14B show examples of the work record data 112. As shown in FIG. 14A, the work record data 112 can be configured as a data table. FIG. 14B shows an example of worker information data 112-1 in which worker information is managed. The worker information data 112-1 may be managed by a system different from the work record extraction device 100, or may be stored in the data storage unit 110.

The work record data 112 stores a result of extracting necessary information based on the check determination data 131 as a work record. In the work record data 112, the presence or absence of a check of a drawing element, a check order obtained by rearranging in chronological order, and a work time obtained by calculation of a time required for a check work are centrally managed as work evidence.

Each row of the work record data 112 includes a check order, a work date and time, a type of a drawing element, a name, a work time, coordinates (x and y coordinates of a start point and an end point), a work drawing name, the presence or absence of a check of a drawing element, and a worker ID. The items of the work record data 112 may be changed as necessary, and not all the illustrated items need to be included. In addition, as other items (not shown), a page number of the drawing or an item included in the check determination data 131 may be input. For example, when the ratio N/Nunit used for the check determination is input, how much a drawing element is overlaid by handwriting can be confirmed.

As shown in #3 to #5 in the work record data 112, the work dates and times are the same in a case where a plurality of drawing elements are collectively checked by one stroke. In this case, since the work time can be considered to be equivalent, the work time is attached to the first work (#3), and parentheses or the like are attached to the work time of the subsequent work (#4 and #5) to indicate that the drawing elements are collectively checked by one stroke, and in this case, it is easy to distinguish at a glance.

The item of the worker ID in the work record data 112 is used in a case where a record in the worker information data 112-1 managed separately is associated with the worker ID. Each row of the worker information data 112-1 includes a worker ID, a name of the worker, the number of years of experience, a device ID, and a site where the worker is working. By associating the work record data 112 and the worker information data 112-1 with each other, it is possible to manage, as work records, "when", "where", "who", "what", and "how" work.

First Embodiment: Operations of Display Data Generation Unit 142

Figure 15A:
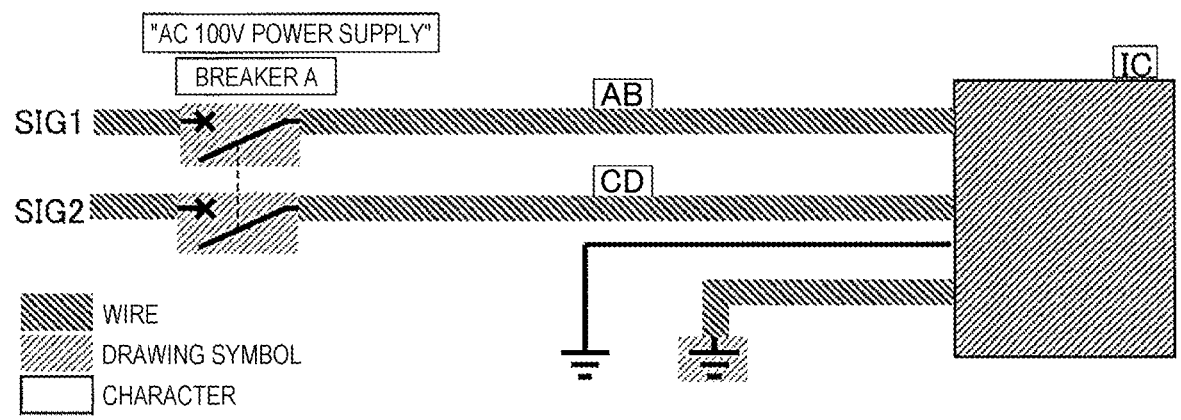
FIG. 15A shows an example of display data 113.
Figure 15B:
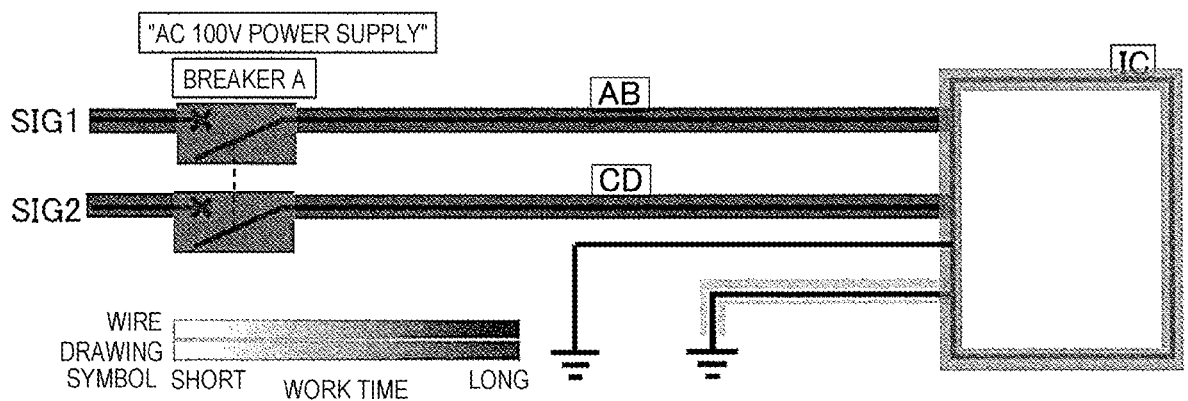
FIG. 15B shows an example of the display data 113.

FIGS. 15A and 15B show examples of the display data 113. The display data generation unit 142 acquires the work record data 112 generated by the work record generation unit 141 from the data storage unit 110, and generates the display data 113 based on the work record data 112. In the display data 113, all data of the work record data 112 does not necessarily need to be visualized, and information to be visualized is extracted and visualized as necessary.

FIG. 15A shows an example of a display drawing in which drawing elements checked by a worker are visualized. FIG. 15B shows an example of a display drawing in which the length of time required for check is visualized by shading of color. As shown in FIG. 15A, with reference to the item of the determination result in the work record data 112, the drawing element checked by the worker can be visualized. The coordinates used for highlighted display during visualization can be acquired with reference to the coordinates of the start point and the end point in the work record data 112. Examples of the highlighted display include a case where a thick line is superimposed on the wire from above, a case where a drawing symbol is surrounded by a square (the inside may be filled or may not be filled), a case where a character is highlighted, and the like. The colors used for the highlighted display are divided for each type of drawing element, so that the presence or absence of a check of each drawing element can be easily understood.

In this manner, the drawing elements checked by the worker are visualized by changing the color, the line width, and the transmittance to appropriate settings, so that a part for which the check is completed becomes clear, and the visualization can be used for work progress management.

Other items (for example, a type, a name, and a work time of a drawing element) in the work record data 112 may be described and confirmed in an annotation in a case where the display data 113 is in a PDF format, for example.

In a case where it is desired to clarify the uncompleted part, the drawing symbol that is not checked may be displayed in a highlighted manner. In this case, in order to prevent excessive information, visualization may be performed using a color, a line width, and a transmittance different from those in the case where the check is performed.

As shown in FIG. 15B, when the work time is visualized by the color gradation with reference to the item of the work record in the work record data 112, the drawing element requiring time for the check can be understood at a glance, and the time-consuming work and the important work can be extracted, so that the visualization of work time can be utilized for work improvement and know-how extraction.

In FIGS. 15A and 15B, the strokes used for checking the drawing elements are not visualized so that the information in the display drawing does not become excessive, and the strokes may also be visualized according to the point group coordinates in the handwritten data 121 as necessary. In this case, the thickness, color, and transmittance of the line of the stroke may be appropriately set and visualized to prevent excessive information.

Second Embodiment

A second embodiment of the invention describes a configuration example in which a note is output to the work record data 112 and the display data 113 including the note is generated. The note refers to handwriting (ink data) for a purpose different from the check of a drawing element. Examples of the note include the following: handwriting in the case of writing a measured voltage value or resistance value in the drawing after confirming conduction or circuit operation; and handwriting for indicating a corrected portion when there is an error in the drawing. In order to more faithfully convert an actual work result into data as a work record, it is necessary to extract a note as data and manage the note as a work record.

Figure 16:
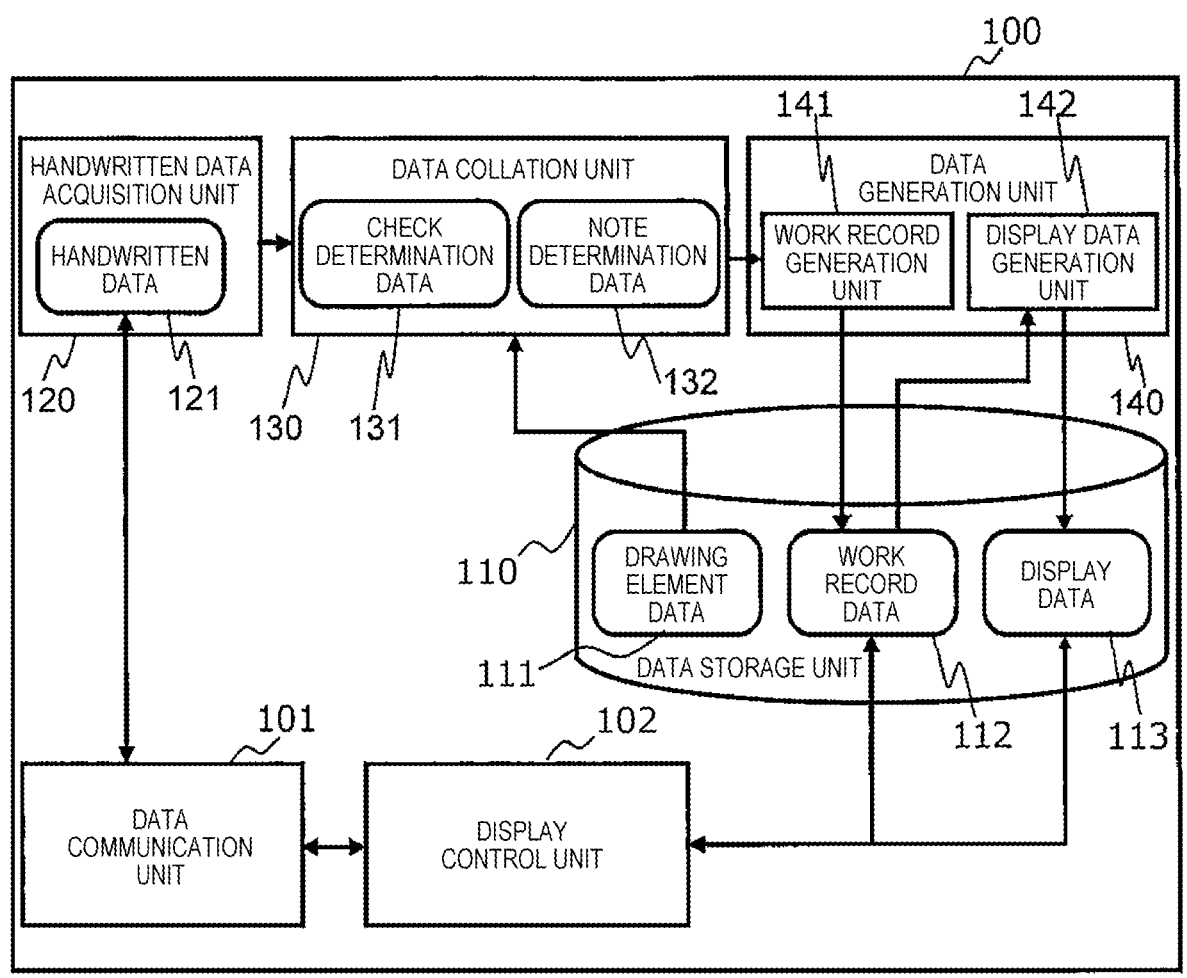
FIG. 16 is a configuration diagram of the work record extraction device 100 according to a second embodiment.

FIG. 16 is a configuration diagram of the work record extraction device 100 according to the second embodiment. As compared with the first embodiment, the data collation unit 130 includes note determination data 132 in addition to the check determination data 131, and the operations of the data collation unit 130 and the work record generation unit 141 are different. The description of the blocks having the same processing as those of the first embodiment will be omitted, and only the internal processing of the data collation unit 130 and the work record generation unit 141 will be described.

The note determination data 132 refers to a set of data including information on a time point at which a note is generated and a note determination result for adding and storing a result of determining whether a stroke is a note to the handwritten data 121 as an item.

Figure 17:
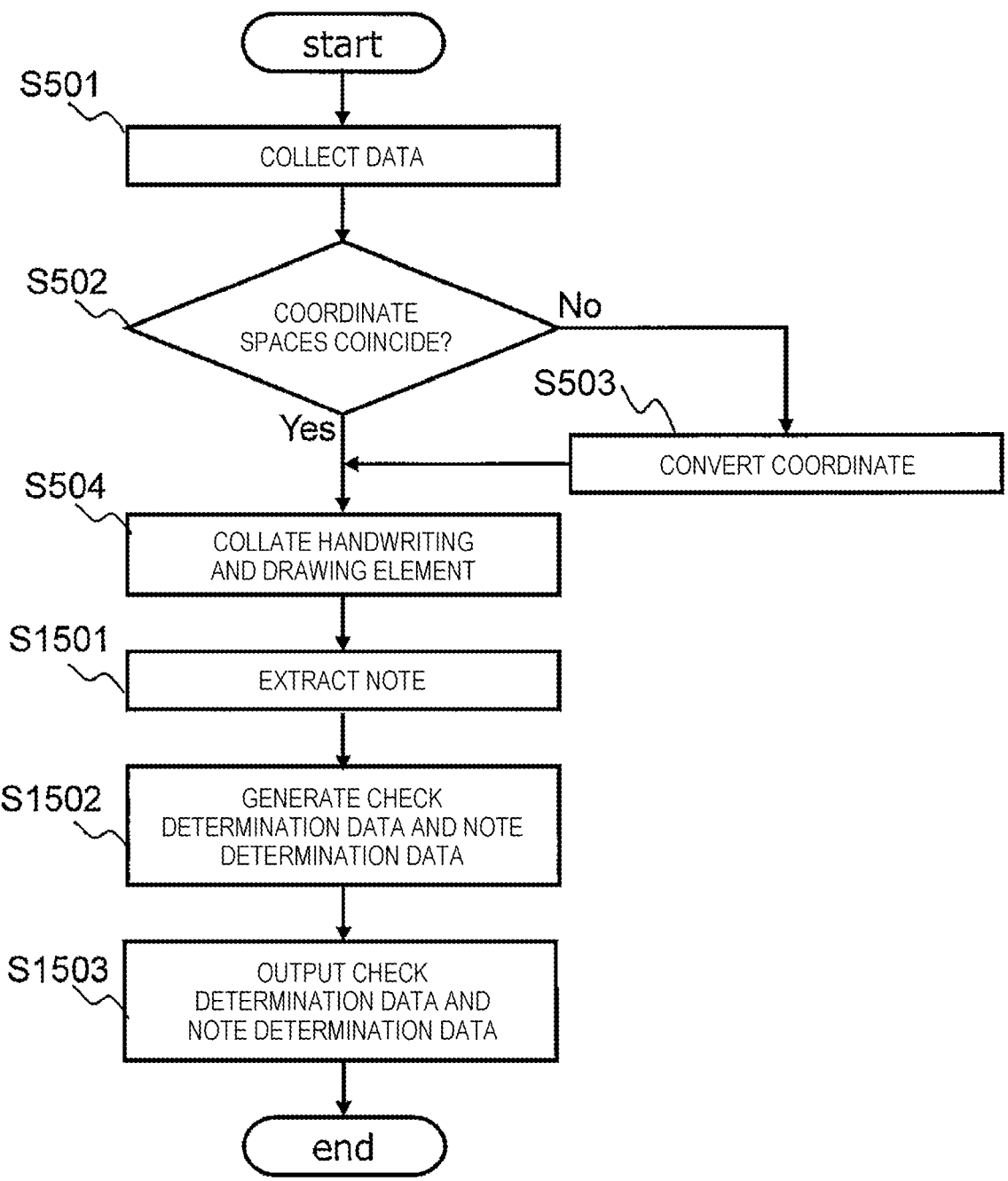
FIG. 17 is a flowchart illustrating operations of the data collation unit 130 according to the second embodiment.

FIG. 17 is a flowchart illustrating the operation of the data collation unit 130 according to the second embodiment. The second embodiment is different from the first embodiment in that a note extracting step (S1501) is added after the handwriting-drawing element collation step (S504), the check determination data generating step (S505) is replaced with a check determination data and note determination data generating step (S1502), and the check determination data output step (S506) is replaced with a check determination data and note determination data output step (S1503). The same portions as those of the first embodiment are denoted by the same reference numerals and the description thereof will be omitted, and only parts having different operations will be described below.

The note extracting step (S1501) is executed after the position coordinate collation between the handwritten data and the drawing element (S504). Although details will be described later, in the note extracting step (S1501), it is determined whether a stroke is a note based on a ratio of the number of point groups not used for checking the drawing element to the number of point groups included in the stroke. At the same time as the check determination data 131 is generated as the check presence and absence determination result of the drawing element, the note determination data 132 is generated as a note determination result (S1502), and the check determination data and the note determination data are output to the work record generation unit 141 of the data generation unit 140 (S1503).

Figure 18C:
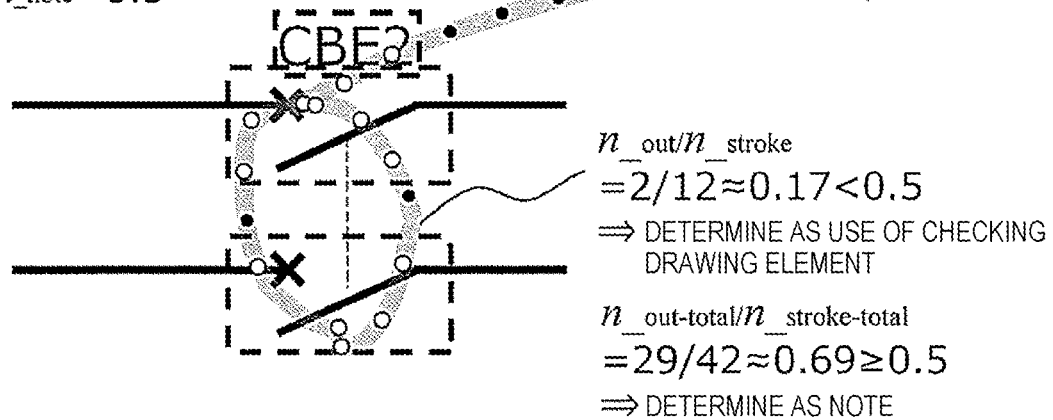
FIG. 18C is a diagram illustrating the determination method for extracting a note in S1501.

FIGS. 18A to 18C are diagrams illustrating a determination method for extracting a note in S1501. FIG. 18A shows an example of a note determination method. FIG. 18B shows a specific example of note determination. FIG. 18C shows an advantage of note determination for each piece of ink data.

In FIG. 18A, relative to a boundary area provided on a drawing element, points in a stroke included in the area are represented by white circles, and points in the stroke not included in the area are represented by black circles. Since the note is a stroke that is not used for checking the drawing element, it is determined whether the stroke is a note based on a ratio of the number of points represented by black circles (points outside the area) to the number of points included in the stroke. A note determination formula is represented by $n\_out/n\_stroke \geq Th\_note$, in which $n\_stroke$ represents the number of points in one stroke, $n\_out$ represents the number of points outside a plurality of divided areas, and $Th\_note$ represents a determination threshold value. When the determination formula is satisfied, it is determined that the stroke is a note, and when the determination formula is not satisfied, it is determined that the stroke is not a note.

As the determination threshold value $Th\_note$ is increased, the stroke is hardly determined as the note, and as determination threshold value Th_note is decreased, the stroke is likely to be determined as the note. The determination threshold value Th_note can be set to be any number between 0 and 1, and it is effective to set the minimum value of Th_note to 0.5 because there is a high possibility that the stroke is left as a note if the number of points outside the boundary area among the number of point groups included in the stroke is half or more in the actual use environment.

FIG. 18B is an example of a drawing for work in which a breaker represented by a drawing symbol is connected between two wires, and characters "CBE2" are described on the breaker. An area surrounded by a broken line represents a boundary area corresponding to each drawing element. In this example, two strokes including an oblique line stroke and a horizontal line stroke are included in the drawing. In the case of the oblique line stroke in FIG. 18B, for example, when the determination threshold value Th_note is set to 0.5, the number of points included in the stroke (n_stroke) is 9, whereas the number of points outside the boundary area (n_out) is 6. Therefore, the determination formula n_out/n_stroke=6/9≈0.67≥Th_note=0.5 is satisfied, and it can be determined that the stroke is a note. In the case of the horizontal stroke in FIG. 18B, the number of points included in the stroke (n_stroke) is 10, whereas the number of points outside the boundary area (n_out) is 0. Therefore, the determination formula n_out/n_stroke=0/10=0.0<Th_note=0.5, and it is determined that the stroke is not a note but handwriting for checking the drawing element.

In a case where a plurality of strokes are managed as one piece of ink data, the note determination may be performed by obtaining a ratio (n_out_total/n_stroke_total) of the sum of n_out and n_stroke to all strokes included in the ink data. Accordingly, even if a stroke is close to a drawing element, it is easy to determine that the stroke is a note.

As shown in FIG. 18C, the worker handwrites six strokes as notes, and these strokes are managed as one ink. When the note determination is performed on the individual strokes, a circle stroke on the lower side of FIG. 18C is close to a drawing element, the determination formula is n_out/n_stroke=2/12≈0.17, and it is determined that the stroke is not a note. In contrast, in a case where the six strokes are determined to be collectively as one piece of ink data, n_out_total/n_stroke_total=29/42≈0.69, and the stroke close to the drawing element can also be determined as a note.

FIG. 19 shows an example of the note determination data 132. The note determination data 132 can be configured as a data table in which the note determination result is shown. In addition to the items included in the handwritten data 121, the note determination data 132 includes the number of points outside the boundary area (n_out), the number of points included in the stroke (n_stroke), a ratio (n_out/n_stroke), and a determination result (in the example of FIG. 17, the determination threshold value Th_note is set to 0.5, and the determination result is described as "note" when the note determination is satisfied, and the determination result is described as "check" when the note determination is not satisfied).

In a case where a plurality of strokes are managed as one piece of ink data as indicated by No. 3 of the note determination data 132, the items of n_out, n_stroke, and ratio may store numerical values for the respective strokes, or may store a value of the sum of the ink data. In FIG. 19, a case of the sum for each ink data is described with parentheses.

FIG. 20 is a flowchart illustrating the operations of the work record generation unit 141 according to the second embodiment. The second embodiment is different from the first embodiment in that a data combining step (S2001) is added before the step of rearranging in chronological order (S1301). The same steps as those of the first embodiment are denoted by the same reference numerals, the description thereof will be omitted, and only parts having different operations will be described below.

In the data combining step (S2001), the check determination data 131 and the note determination data 132 are combined before the step of rearranging in chronological order (S1301). In the step of rearranging in chronological order (S1301), records are rearranged in chronological order based on the combined data of the check determination data 131 and the note determination data 132. By combining the check determination data 131 and the note determination data 132, the check result and the annotation of the drawing element can be managed as one piece of time-series work record data 112.

As an example of a combining method, necessary information is extracted from the note determination data 132 and combined so as to match the item of the check determination data 131. As an example in which the items of the note determination data 132 are made to correspond to the items included in the check determination data 131, "note" is stored in the column of the drawing element, "unique note name (for example, name that can be distinguished such as note 1 and note 2)" is stored in the column of the name, "coordinates of point group included in the ink data" is stored in the coordinate column, "value of n_out" is stored in the N column, "value of n_total" is stored in the Nunit column, "ratio of n_out/n_total" is stored in the ratio column, "note determination result" is stored in the determination result column, and "generation time point" is stored in the check time point column. In other items that do not correspond to each other (for example, ink No., stroke No., and point No.), a blank or "-" is stored.

FIG. 21 shows an example of the work record data 112 according to the second embodiment. The second embodiment is different from the first embodiment in that note information is newly added. In FIG. 21, #6 and #9 correspond to the note data. According to the work record data 112 of FIG. 21, the timing at which the note is generated in addition to the check of the drawing element can be grasped as the work record. In addition, when the display data generation unit 142 generates the display data 113, the note described in the work record data 112 is visualized in addition to the drawing element, and the stroke on the drawing element is not visualized, so that only the information necessary for the user can be narrowed down, and the display data 113 can be displayed with high visibility.

According to the second embodiment, by adding the annotation extracting step (S1501) to the data collation unit 130, the information on the note written by the worker can be converted into data as a work record. For example, it is possible to grasp the timing at which the voltage value or the resistance value measured by the worker, the correction content in the case where there is an error in the drawing, and the like are written and the content thereof, and it is possible to implement visualization by which the actual work is reflected in detail.

Third Embodiment

A third embodiment of the invention describes a configuration in which the note is converted into data with higher accuracy by improving the determination accuracy of the note extraction in the second embodiment. In the third embodiment, the pen attributes (color, width, transmittance, and pen type) in the handwritten data 121 are utilized, and the pen attributes when the note is described as the rule of the work are determined in advance, so that the notes can be easily separated. The pen attribute mentioned here is a virtual input device on an application, which is used for inputting handwritten data on the work terminal. For example, when the worker touches the screen of the work terminal, the pen on the application moves along the touch position on the screen. Since the pen can be used on the application in the same manner as a pen, the pen is referred to as a virtual pen device herein.

The third embodiment is different from the second embodiment in the operation of the data collation unit 130. The description of the blocks having the same processing as that of the second embodiment will be omitted, and only the internal processing of the data collation unit 130 will be described.

Figure 22:
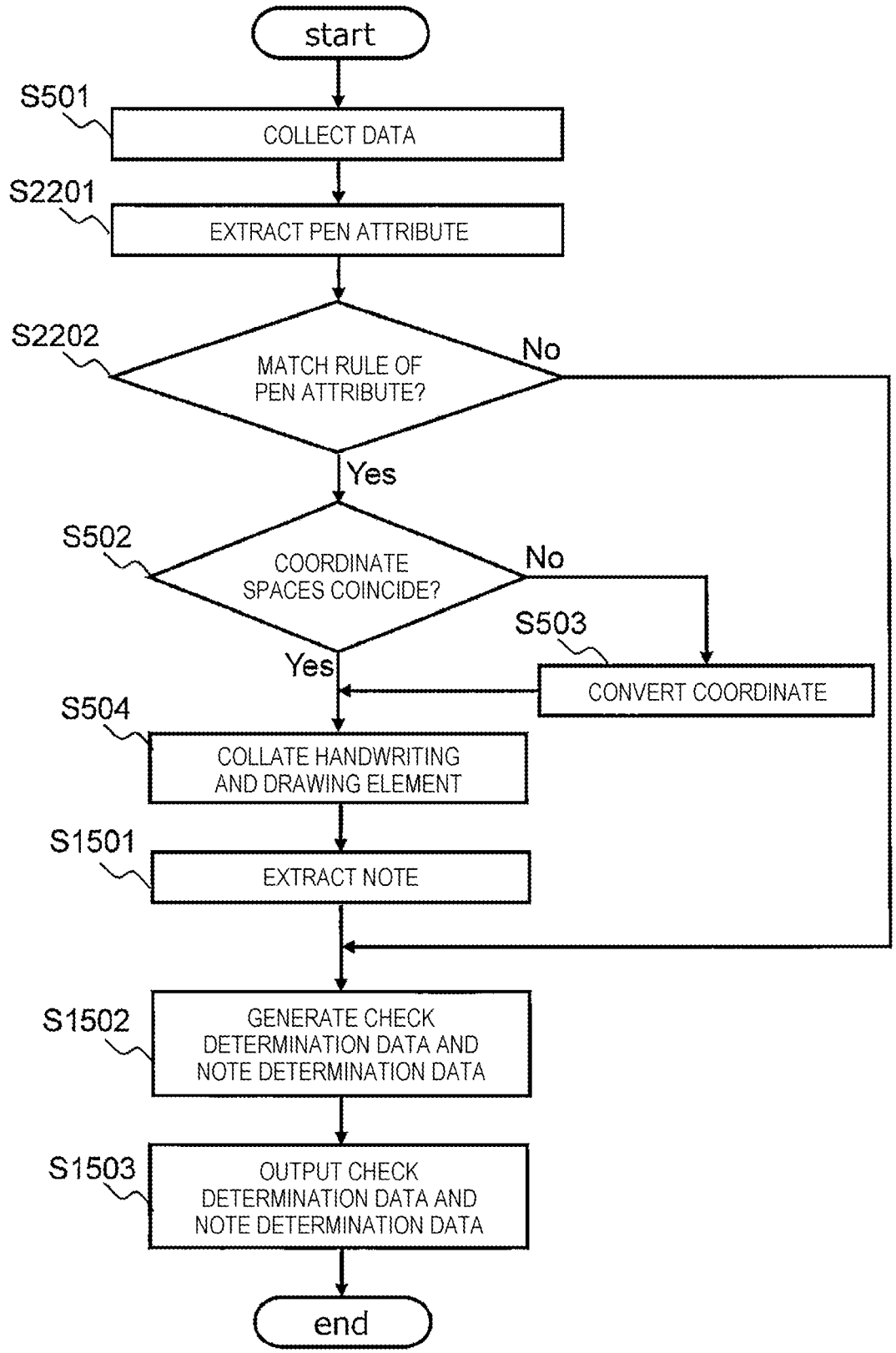
FIG. 22 is a flowchart illustrating operations of the data collation unit 130 according to a third embodiment.

FIG. 22 is a flowchart illustrating the operations of the data collation unit 130 according to the third embodiment. The third embodiment is different from the second embodiment in that a pen attribute extracting step (S2201) and a step of branching based on a note determination rule of the pen attribute (S2202) are added. The same steps as those of the second embodiment are denoted by the same reference numerals, the description thereof will be omitted, and only parts having different operations will be described below.

The data collation unit 130 extracts a pen attribute in the handwritten data 121 acquired in the data collecting step (S501) (S2201). The data collation unit 130 proceeds to the handwriting-drawing element collation step (S504) for a stroke that does not match the predetermined note rule. The stroke corresponding to the note determination rule can be considered to be a note, so that the processing proceeds to S1502, and the note determination data 132 for the stroke is generated.

The note rule specifies a pen attribute used for inputting a note, so that when handwriting corresponds to the note rule, the stroke is considered to be a note without executing S502 to S1501. The handwriting that does not correspond to the note rule may be used to trace the drawing, so that the same determination as in the first and second embodiments is made by executing S502 to S1501.

As an example of the note rule, a drawing attribute of an image drawn by a pen can be used, such as a pen having a color of black, a thickness of 2 pt, a transmittance of 0%, a pen type of a normal pen, or a combination thereof when handwritten. In addition, a rule of a pen attribute corresponding to the handwriting-drawing collation (S504) may be determined. As a rule in this case, for example, a color of a handwriting pen is red, a thickness is 6 pt, a transmittance is 60%, a pen type is a marker, or a combination thereof can be used.

According to the third embodiment, pen attribute extraction (S2201) is added to the data collation unit 130, and notes are separated according to a determination rule of the predetermined pen attribute, so that the handwriting can be easily separated as a note even if the handwriting is close to a drawing element. In addition, with the configuration combined with the note extraction (S1501) for determining based on the number of points in the stroke, the note can be determined even if the note is written by the worker with the pen attribute that does not match the note rule, and therefore, the note extraction with higher accuracy is enabled.

Modification of Invention

The invention is not limited to the above embodiments, and includes various modifications. For example, the above embodiments are described in detail for easy understanding of the invention, and the invention is not necessarily limited to those including all the configurations described above. Further, a part of a configuration according to one embodiment can be replaced with a configuration according to another embodiment, and the configuration according to another embodiment can be added to the configuration according to one embodiment. A part of the configuration of each embodiment can be combined with another configuration, omitted, or replaced with another configuration.

Only one first terminal 10 is shown in FIG. 2, and several hundred first terminals 10 and one data communication unit 101 may transmit and receive data. In FIG. 2, the data storage unit 110 is included in the work record extraction device 100. The data storage unit 110 may be located in a spatially different place, and may perform data communication with the work record extraction device 100 via a network.

The information included in the handwritten data 121 may be changed as necessary, and may not include all the items shown in FIG. 3B. The information may include other items (not shown), for example, a handwriting end time point, a handwritten drawing name, a page number, a stroke number included in each ink data, and a point number included in each stroke. FIG. 3B shows an example in which the handwritten data 121 is configured as a data table, and the format is not limited to a table and may be a data format such as text data as long as the information described above is included. The same applies to the other data tables.

The name of the drawing with handwriting and the page number may be described in the name of the file in which the handwritten data 121 is stored, and the handwritten data may be distinguished for each drawing and each page number. The handwritten data 121 may be managed for each page included in the drawing, or a plurality of pages may be collectively managed for each name of the drawing.

The information included in the wire data 111-1, the drawing symbol data 111-2, and the character data 111-3 described with reference to FIGS. 4A to 4C may be changed as necessary, and not all the items shown in the drawing need to be included. In addition, other items (not shown), for example, a drawing name including the elements, and a page number may be included.

What is claimed is:

1. A work record extraction device comprising:
a processor, configured to:
acquire handwritten data showing a path along which a worker traces a drawing element on drawing data on a work terminal by a manual input; and
specify the drawing element through which the handwritten data has passed by collating the handwritten data with the drawing data, wherein
set, around the drawing element, a boundary area including at least a part of the drawing element,
determine whether the handwritten data passes through at least a part of the boundary area, and determines that the handwritten data passes through the drawing element when the handwritten data passes through at least a part of the boundary area,
output a result of the determination,
generate display data for displaying, on a screen, a work record shown by the work record data, wherein the display data is displayed by visualizing whether the handwritten data passes through the drawing element using at least one of a color, a transmittance, and a line thickness corresponding to a time that is required for each work and is shown by the work record data, and store the generated display data in a storage device.

2. The work record extraction device according to claim 1, wherein the processor is configured to:
acquire direction data representing a direction in which the drawing element extends or a direction in which the drawing element is connected to another drawing element,
divide the boundary area for each unit width along a first direction specified by the direction data,
determine, for each of the divided unit widths, whether the handwritten data passes through an area divided into the unit widths, and
determine that the handwritten data passes through the drawing element in a case where the number of the unit widths of the boundary area through which the handwritten data passes satisfies a threshold value relative to the total number of the unit widths of the boundary area.

3. The work record extraction device according to claim 2, wherein the processor is configured to:
in a case where the drawing element is a straight line, acquire as the first direction, a direction in which the straight line extends, and
in a case where the drawing element is a character string, acquire as the first direction, a direction in which the character strings are arranged.

4. The work record extraction device according to claim 2, wherein
a size of the unit width is a half of a minimum width of widths of all the drawing elements included in the drawing data.

5. The work record extraction device according to claim 2, wherein
the boundary area has an allowable width in a second direction orthogonal to the first direction,
the allowable width has a size obtained by adding a spot size of an input device used by the worker to input the handwritten data on the work terminal to a size of the drawing element in the second direction, and
determine that the handwritten data passes through the boundary area in a case where a path through which the handwritten data passes is included within the allowable width.

6. The work record extraction device according to claim 5, wherein the processor is configured to:
in a case where the drawing element extends in an oblique direction relative to the first direction in the drawing data,
set the boundary area around the drawing element by continuously arranging one or more rectangles having the unit width and the allowable width along the drawing element.

7. The work record extraction device according to claim 5, wherein the processor is configured to:
in a case where the drawing element extends in an oblique direction relative to the first direction in the drawing data, set the allowable width such that
as an angle between an extending direction of the drawing element and a 450 direction on a coordinate axis in the drawing data increases, the allowable width increases,
a minimum value of the allowable width is a size of the drawing element in the second direction, and
a maximum value of the allowable width is a size obtained by adding the spot size to a size of the drawing element in the second direction.

8. The work record extraction device according to claim 2, wherein the processor is configured to:
in a case where the drawing element is connected to another drawing element in both a horizontal direction and a vertical direction in the drawing data,
execute the determination of whether the handwritten data passes through at least the part of the boundary area by setting either one of the horizontal direction and the vertical direction as the first direction, and wherein when the threshold value is not satisfied, set another one of the horizontal direction and the vertical direction as the first direction and perform the determination of whether the handwritten data passes through at least the part of the boundary area.

9. The work record extraction device according to claim 1, wherein the processor is configured to:
calculate a circumscribed rectangle of the handwritten data, and
determine whether the handwritten data passes through the boundary area only for a drawing element at least a part of which is included in the circumscribed rectangle among the drawing elements.

10. The work record extraction device according to claim 1, wherein the processor is configured to:
execute note identification processing of classifying a path through which the handwritten data passes into a path through which the drawing element passes and a path through which a note is input by handwriting, and
classify the handwritten data as the note in a case where the number of sample points included in the boundary area set around the drawing element among the sample points in the handwritten data does not satisfy a threshold value relative to the total number of the sample points.

11. The work record extraction device according to claim 10, wherein the processor is configured to:
in a case where a plurality of pieces of the handwritten data are generated within a predetermined time,
classify the handwritten data as the note in a case where the number of sample points included in the boundary area set around the drawing element among the sample points of the handwritten data generated within the predetermined time does not satisfy a threshold value relative to the total number of the sample points of the handwritten data generated within the predetermined time.

12. The work record extraction device according to claim 1, wherein the processor is configured to:
acquire a drawing attribute of a handwritten image drawn on the work terminal by the handwritten data,
execute note identification processing of classifying a path through which the handwritten data passes into a path through which the drawing element passes and a path through which a note is input by handwriting, according to whether the drawing attribute corresponds to a predetermined rule, and
the drawing attribute is at least one of
a pen type of a virtual pen device used for inputting the handwritten data,
a line color of the handwritten image,
a line thickness of the handwritten image, and
a transmittance of the handwritten image.

13. The work record extraction device according to claim 1, wherein the processor is configured to:
generate a work record executed by the worker on the work terminal,
align in chronological order, results of the determination,
calculate a time required for work represented by the handwritten data in accordance with time points in the aligned time series, and generate work record data showing a result of the calculation, and store the work record data in the storage device.

14. A work record extraction system comprising:

a work record extraction device according to claim 1; and the work terminal, wherein the work record extraction device acquires the handwritten data from the work terminal.

* * * * *